(12) United States Patent
Covaci et al.

(10) Patent No.: US 11,575,511 B2
(45) Date of Patent: Feb. 7, 2023

(54) SYSTEM FOR SIMPLIFYING EXECUTABLE INSTRUCTIONS FOR OPTIMISED VERIFIABLE COMPUTATION

(71) Applicant: nChain Licensing AG, Zug (CH)

(72) Inventors: Alexandra Covaci, Canterbury (GB); Simone Madeo, London (GB); Patrick Motylinski, London (GB); Stephane Vincent, Luxembourg (LU)

(73) Assignee: nChain Licensing AG, Zug (CH)

( * ) Notice: Subject to any disclaimer, the term of this patent is extended or adjusted under 35 U.S.C. 154(b) by 257 days.

(21) Appl. No.: 16/762,466

(22) PCT Filed: Oct. 29, 2018

(86) PCT No.: PCT/IB2018/058432
§ 371 (c)(1),
(2) Date: May 7, 2020

(87) PCT Pub. No.: WO2019/092542
PCT Pub. Date: May 16, 2019

(65) Prior Publication Data
US 2020/0366492 A1    Nov. 19, 2020

(30) Foreign Application Priority Data

Nov. 9, 2017 (GB) ..................................... 1718505
Nov. 30, 2017 (GB) ..................................... 1719998
(Continued)

(51) Int. Cl.
*H04L 29/06* (2006.01)
*H04L 9/30* (2006.01)
(Continued)

(52) U.S. Cl.
CPC ............ *H04L 9/3066* (2013.01); *G06F 8/447* (2013.01); *G06F 8/451* (2013.01);
(Continued)

(58) Field of Classification Search
CPC ................. H04L 9/3066; H04L 9/0618; H04L 9/0637; H04L 9/0643; H04L 9/30; H04L 9/3218;
(Continued)

(56) References Cited

U.S. PATENT DOCUMENTS 4,667,290 A    5/1987 Goss et al.
5,297,150 A    3/1994 Clark
(Continued)

FOREIGN PATENT DOCUMENTS

CN    107179932 A    9/2017
CN    107274184 A    10/2017
(Continued)

OTHER PUBLICATIONS

Maxwell et al., "Really Really ultimate blockchain compression: CoinWitness," Bitcoin Forum, Aug. 19, 2013 [retrieved Apr. 11, 2018], https://bitcointalk.org/index.php?topic=277389.0, 7 pages.
(Continued)

*Primary Examiner* — Mahfuzur Rahman
(74) *Attorney, Agent, or Firm* — Davis Wright Tremaine LLP

(57) ABSTRACT

The invention relates to distributed ledger technologies such as consensus-based blockchains. Computer-implemented N methods for reducing arithmetic circuits derived from smart contracts are described. The invention is implemented using a blockchain network, which may be, for example, a Bitcoin blockchain. A set of conditions encoded in a first programming language is obtained. The set of conditions is converted into a programmatic set of conditions encoded in a second programming language. The programmatic set of
(Continued)

conditions is precompiled into precompiled program code. The precompiled program code is transformed into an arithmetic circuit. The arithmetic circuit is reduced to form a reduced arithmetic circuit, and the reduced arithmetic circuit is stored.

20 Claims, 10 Drawing Sheets

(30) Foreign Application Priority Data

| | | |
|---|---|---|
| Dec. 13, 2017 | (GB) | 1720768 |
| Feb. 2, 2018 | (GB) | 1801753 |
| Apr. 10, 2018 | (GB) | 1805948 |
| Apr. 20, 2018 | (GB) | 1806444 |

(51) Int. Cl.

| | |
|---|---|
| H04L 9/06 | (2006.01) |
| H04L 9/32 | (2006.01) |
| H04L 9/40 | (2022.01) |
| G06F 8/41 | (2018.01) |
| G06F 9/445 | (2018.01) |
| G06Q 20/40 | (2012.01) |
| G06F 16/27 | (2019.01) |
| G06Q 20/06 | (2012.01) |
| H04L 9/00 | (2022.01) |

(52) U.S. Cl.
CPC .......... *G06F 9/44521* (2013.01); *G06F 16/27* (2019.01); *G06Q 20/065* (2013.01); *G06Q 20/401* (2013.01); *G06Q 20/405* (2013.01); *H04L 9/0618* (2013.01); *H04L 9/0637* (2013.01); *H04L 9/0643* (2013.01); *H04L 9/30* (2013.01); *H04L 9/3218* (2013.01); *H04L 9/3236* (2013.01); *H04L 9/3239* (2013.01); *H04L 9/3247* (2013.01); *H04L 9/3263* (2013.01); *H04L 63/12* (2013.01); *G06F 8/44* (2013.01); *H04L 9/50* (2022.05); *H04L 2209/34* (2013.01); *H04L 2209/56* (2013.01)

(58) Field of Classification Search
CPC ... H04L 9/3236; H04L 9/3239; H04L 9/3247; H04L 9/3263; H04L 63/12; H04L 9/50; H04L 2209/34; H04L 2209/56; H04L 2209/127; H04L 9/085; G06F 8/447; G06F 8/451; G06F 9/44521; G06F 16/27; G06F 8/44; G06Q 20/065; G06Q 20/401; G06Q 20/405
See application file for complete search history.

(56) References Cited

U.S. PATENT DOCUMENTS

| | | | |
|---|---|---|---|
| 5,404,531 | A | 4/1995 | Wakatani |
| 5,499,191 | A * | 3/1996 | Young ..................... G06F 30/34 |
| | | | 716/132 |
| 5,920,830 | A | 7/1999 | Hatfield et al. |
| 6,519,754 | B1 | 2/2003 | McElvain et al. |
| 7,085,701 | B2 | 8/2006 | Rich et al. |
| 7,209,555 | B2 | 4/2007 | Futa et al. |
| 7,281,017 | B2 | 10/2007 | Hostetter et al. |
| 8,165,287 | B2 | 4/2012 | Ghouti et al. |
| 8,331,556 | B2 | 12/2012 | Billet et al. |
| 8,607,129 | B2 | 12/2013 | Radhakrishnan et al. |
| 8,824,670 | B2 | 9/2014 | Icart et al. |
| 9,026,978 | B1 | 5/2015 | Liu et al. |
| 9,286,602 | B2 | 3/2016 | Rosati et al. |
| 9,483,596 | B1 | 11/2016 | Badar et al. |
| 9,569,771 | B2 | 2/2017 | Lesavich et al. |
| 10,135,607 | B1 * | 11/2018 | Roets ..................... G06F 21/64 |
| 2003/0125917 | A1 | 7/2003 | Rich et al. |
| 2004/0015739 | A1 | 1/2004 | Heinkel et al. |
| 2006/0149962 | A1 | 7/2006 | Fountain et al. |
| 2007/0061487 | A1 * | 3/2007 | Moore ..................... G06F 16/27 |
| | | | 707/E17.032 |
| 2007/0157132 | A1 | 7/2007 | Cheng et al. |
| 2008/0127067 | A1 | 5/2008 | Aubertine et al. |
| 2010/0067686 | A1 | 3/2010 | Minematsu |
| 2010/0131933 | A1 | 5/2010 | Kim et al. |
| 2010/0272209 | A1 | 10/2010 | Lee et al. |
| 2013/0031446 | A1 | 1/2013 | Kamiya |
| 2013/0097420 | A1 | 4/2013 | Zaverucha |
| 2014/0321644 | A1 | 10/2014 | Lemieux |
| 2015/0379510 | A1 | 12/2015 | Smith |
| 2016/0004820 | A1 * | 1/2016 | Moore ..................... G16H 15/00 |
| | | | 705/3 |
| 2016/0087802 | A1 | 3/2016 | Peeters |
| 2016/0162897 | A1 | 6/2016 | Feeney |
| 2016/0283941 | A1 | 9/2016 | Andrade |
| 2016/0357948 | A1 | 12/2016 | Takeuchi |
| 2017/0091750 | A1 | 3/2017 | Maim |
| 2017/0131983 | A1 | 5/2017 | Roytman et al. |
| 2017/0132619 | A1 | 5/2017 | Miller et al. |
| 2017/0140408 | A1 | 5/2017 | Wuehler |
| 2017/0142103 | A1 | 5/2017 | Bringer et al. |
| 2017/0177312 | A1 | 6/2017 | Boehm et al. |
| 2017/0178263 | A1 | 6/2017 | Kraemer et al. |
| 2017/0180341 | A1 | 6/2017 | Walker et al. |
| 2017/0220815 | A1 | 8/2017 | Ansari et al. |
| 2017/0249716 | A1 | 8/2017 | Meixner et al. |
| 2017/0277909 | A1 | 9/2017 | Kraemer et al. |
| 2017/0278100 | A1 | 9/2017 | Kraemer et al. |
| 2017/0279611 | A1 | 9/2017 | Kraemer et al. |
| 2017/0286079 | A1 | 10/2017 | Cho et al. |
| 2017/0286717 | A1 | 10/2017 | Khi et al. |
| 2017/0287090 | A1 | 10/2017 | Hunn et al. |
| 2017/0317834 | A1 | 11/2017 | Smith et al. |
| 2017/0337319 | A1 * | 11/2017 | Camus ................ G06F 30/3312 |
| 2017/0352209 | A1 | 12/2017 | Keuffer et al. |
| 2017/0353309 | A1 | 12/2017 | Gray |
| 2018/0034634 | A1 | 2/2018 | Benarroch Guenun et al. |
| 2018/0039667 | A1 | 2/2018 | Pierce et al. |
| 2018/0117446 | A1 | 5/2018 | Tran et al. |
| 2018/0167201 | A1 | 6/2018 | Naqvi |
| 2019/0095631 | A1 * | 3/2019 | Roets ..................... G06F 21/62 |
| 2019/0138753 | A1 | 5/2019 | Wallrabenstein |
| 2019/0295182 | A1 | 9/2019 | Kfir et al. |

FOREIGN PATENT DOCUMENTS

| | | |
|---|---|---|
| EP | 3249599 A1 | 11/2017 |
| JP | 5697153 B2 | 4/2015 |
| WO | 2016155804 A1 | 10/2016 |
| WO | 2016206567 A1 | 12/2016 |
| WO | 2017008829 A1 | 1/2017 |
| WO | 2017079652 A1 | 5/2017 |
| WO | 2017145010 A1 | 8/2017 |
| WO | 2017148527 A1 | 9/2017 |
| WO | 2017178956 A1 | 10/2017 |
| WO | 2018127446 A1 | 7/2018 |
| WO | 2018127456 A2 | 7/2018 |

OTHER PUBLICATIONS

Maxwell, "The First Successful Zero-Knowledge Contingent Payment," Bitcoin Core, retrieved from https://bitcoincore.org/en/2016/02/26/zero-knowledge-contingent-payments-announcement/, Feb. 26, 2016, 5 pages.

Mayer, "zk-SNARK Explained: Basic Principles," Dec. 13, 2016, 9 pages.

Mayer, "zk-SNARK explained: Basic Principles," retrieved from https://www.researchgate.net/publication/321124635_zk-SNARK_explained_Basic_Principles, Dec. 2016, 9 pages.

Müller, "A Short Note on Secret Sharing Using Elliptic Curves," Proceedings of SECRYPT 2008, Jul. 26, 2008, http://www.scitepress.org/Papers/2008/19183/19183.pdf, 4 pages.

(56) References Cited

OTHER PUBLICATIONS

Nakamoto, "Bitcoin: A Peer-to-Peer Electronic Cash System," Bitcoin, Oct. 31, 2008, https://bitcoin.org/bitcoin.pdf, 9 pages.

Ning, "Automatically Convert MATLAB Code to C Code," https://www.mathworks.com/videos/automatically-converting-matlab-code-to-c-code-96483.html, Aug. 19, 2014, 8 pages.

Parno et al., "Pinocchio: Nearly Practical Verifiable Computation," IEEE Symposium on Security and Privacy, May 19-22, 2013, 16 pages.

Parno, "A Note on the Unsoundness of vnTinyRAM's SNARK," retrieved from https://eprint.iacr.org/2015/437, May 6, 2015, 4 pages.

Prasad et al., "Effect pf Quine-McCluskey Simplification on Boolean Space Complexity," IEEE Xplore, Jul. 25-26, 2009, 6 pages.

Ritzdorf et al., "TLS-N: Non-repudiation over TLS Enabling Ubiquitous Content Signing for Disintermediation," IACR ePrint report, first disclosed 2017 [retrieved May 2, 2018], 16 pages.

Satoshi et al., "Connection Limits," Bitcoin Forum, Aug. 9, 2010, https://bitcointalk.org/index.php?topic=741.0;prev_next=prev, 2 pages.

Schaeffer et al., "ZoKrates—a Toolbox for zkSNARKS on Ethereum," https://github.com/Zokrates/ZoKrates, Feb. 4, 2019, 3 pages.

Schoenmakers et al., "Trinocchio: Privacy-Preserving Outsourcing by Distributed Verifiable Computation," International Conference on Applied Cryptography and Network Security, Jun. 19, 2016, https://eprint.iacr.org/2015/480.pdf, 33 pages.

Stuart, "EECS Presents Awards for Outstanding PhD and SM Theses," EECS, Nov. 8, 2017, 2 pages.

Sward et al. "Data Insertion in Bitcoin's Blockchain" [online] Augustana College, Jul. 2017 [retrieved Feb. 10, 2022]. Retrieved from the Internet: URL: https://digitalcommons.augustana.edu/cgi/viewcontent.cgi?article=1000&context=cscfaculty 2017, 19 pages.

Teutsch et al., "A scalable verification solution for blockchains," Nov. 16, 2017, https://people.cs.uchicago.edu/~teutsch/papers/truebit.pdf, 50 pages.

Tillich et al., "Circuits of basic functions suitable for MPC and FHE," https://homes.esat.kuleuven.be/~nsmart/MPC/, first disclosed 2012, retrieved May 2, 2018, 2 pages.

Todd, "[bitcoin-dev] Building Blocks of the State Machine Approach to Consensus," petertodd.org, Jun. 20, 2016, https://lists.linuxfoundation.org/pipermail/bitcoin-dev/2016-June/012773.html, six pages.

Turner, "Designing Digital Circuits a modern approach," CSE 260, Introduction to Digital Logic and Computer Design, Spring 2014, 435 pages.

UK Commercial Search Report dated Dec. 3, 2018, Patent Application No. GB1806444.4, 8 pages.

UK Commercial Search Report dated Feb. 2, 2018, Patent Application No. GB 1718505.9, 7 pages.

UK Commercial Search Report dated May 31, 2018, Patent Application No. GB1801753.3, 8 pages.

UK Commercial Search Report dated Oct. 25, 2018, Patent Application No. GB1805948.5, 9 pages.

UK IPO Search Report dated Jul. 26, 2018, Patent Application No. GB1801753.3, 5 pages.

UK IPO Search Report dated Nov. 2, 2018, Patent Application No. GB1805948.5, 4 pages.

UK IPO Search Report dated Nov. 8, 2018, Patent Application No. GB1806444.4, 6 pages.

United Kingdom Commercial Search Report dated Apr. 20, 2018, Patent Application No. 1720768.9, filed Dec. 13, 2017, 8 pages.

United Kingdom Intellectual Property Office Search Report dated Jun. 12, 2018, Patent Application No. 1720768.9, filed Dec. 13, 2017, 7 pages.

United Kingdom Intellectual Property Office Search Report dated May 3, 2018, Patent Application No. 1719998.5, filed Nov. 30, 2017, 6 pages.

United Kingdom IPO Search Report dated Apr. 27, 2018, Patent Application No. 1718505.9, filed Nov. 9, 2017, 5 pages.

Viacoin Dev Team, "Styx: Unlinkable Anonymous Atomic Payment Hub For Viacoin," viacoin.org, Oct. 14, 2016, http://docplayer.net/35213119-Styx-unlinkable-anonymous-atomic-payment-hub-for-viacoin-viacoin-dev-team-viacoin-org.html, 18 pages.

Virza, "On Deploying Succinct Zero-Knowledge Proofs" [online] MIT, Sep. 2017 [retrieved Feb. 10, 2022]. Retrieved from the Internet: URL: On Deploying Succinct Zero-Knowledge Proofs, 2016, 131 pages.

Wikipedia, "Precompiled Header," Retrieved Mar. 30, 2022, https://en.wikipedia.org/w/index.php?title=Precompiled_header&oldid=807155683, 3 pages.

Wikipedia, "Zero Knowledge Contingent Payment," Bitcoin Wiki, retrieved from https://en.bitcoin.it/wiki/Zero_Knowledge_Contingent_Payment, Apr. 8, 2020, 3 pages.

Wu et al., "Libsnark: a C++ Library for zkSNARK Proofs," SCIPR Lab, libsnark/README.md at 92a80f74727091fdc40e6021dc42e9f6b67d5176, Aug. 18, 2017, 9 pages.

ZCash, "zk-SNARKs," zCash website, retreived Apr. 1, 2022 from https://web.archive.org/web/20171107012237/https://z.cash/technology/zksnarks.html, Nov. 24, 2017, 1 page.

Kuzminov et al., "Bridging the Gaps with Iolite Blockchain," Iolite Foundation White Paper, 2017, 13 pages.

Keutzer et al., "Anatomy of a Hardware Compiler," 1988, 10 pages.

International Search Report and Written Opinion dated Jan. 17, 2019, Patent Application No. PCT/IB2018/058432, 11 pages.

Antonopoulos, "Mastering Bitcoin—Unlocking Digital Cryptocurrencies," O'Reilly Media, Inc., Dec. 20, 2014, 282 pages.

Ben-Sasson et al. "Scalable Zero Knowledge via Cycles of Elliptic Curves" [online] IACR, Sep. 18, 2016 [retrieved Feb. 10, 2022]. Retrieved from https://eprint.iacr.org/2014/595.pdf, 2016, 49 pages.

Ben-Sasson et al., "SNARKs for C: Verifying program executions succinctly and in zero knowledge," Advances in Cryptology—CRYPTO 2013, Aug. 18, 2013, 19 pages.

Ben-Sasson et al., "Succinct Non-Interactive Zero Knowledge for a von Neumann Architecture," USENIX Security 2014, first disclosed Dec. 30, 2013, last revised May 19, 2015, https://eprint.iacr.org/2013/879.pdf, 37 pages.

Ben-Sasson et al., "Zerocash: Decentralized Anonymous Payments from Bitcoin," 2014 IEEE Symposium on Security and Privacy, May 18, 2014, http://zerocash-project.org/media/pdf/zerocash-oakland2014.pdf, 16 pages.

Bitcoinstrings, "Blockchain in Words," retrieved from https://bitcoinstrings.com/blk00281.txt, Dec. 2013, 667 pages.

Bowe, "Pay-to-Sudoku," GitHub, retrieved from https://github.com/zcash-hackworks/pay-to-sudoku/blob/master/README.md, 2016, 2 pages.

Brown et al., "Transport layer security (tls) evidence extensions," Working Draft, IETF Secretariat, Internet-Draft drafthousley-evidence-extns-01, https://tools.ietf.org/pdf/draft-housley-evidence-extns-01, Nov. 2006 [retrieved May 2, 2018], 21 pages.

Buterin, "Quadratic Arithmetic Programs: from Zero to Hero," retrieved from https://medium.com/@VitalikButerin/quadratic-arithmetic-programs-from-zero-to-hero-f6d558cea649, Dec. 11, 2016, 9 pages.

Campanelli et al., "Zero-knowledge contingent payments revisited: Attacks and payments for services," Proceedings of the 2017 ACM SIGSAC Conference on Computer and Communications Security, Oct. 30, 2017, 28 pages.

Canetti et al., "Practical Delegation of Computation Using Multiple Servers," CCS, Oct. 17, 2011, 10 pages.

Castor, "Trust Your Oracle? Cornell Launches Tool for Confidential Blockchain Queries," CoinDesk, retrieved from https://www.coindesk.com/tech/2017/05/17/trust-your-oracle-cornell-launches-tool-for-confidential-blockchain-queries/, May 17, 2017, 5 pages.

Commercial Search Report dated Feb. 28, 2018, United Kingdom Patent Application No. 1719998.5, filed Nov. 30, 2017, 6 pages.

Costello et al., "Geppetto: versatile Verifiable Computation," 2015 IEEE Symposium on Security and Privacy, 2015, 22 pages.

Covaci et al., "Computer-implemented system and method," United Kingdom Patent Application No. 1720946.1, filed Dec. 15, 2017.

Covaci et al., "Extracting Information from the CRS in a ZK Protocol on Blockchain," United Kingdom Patent Application No. 1719998.5, filed Nov. 30, 2017.

(56) References Cited

OTHER PUBLICATIONS

Covaci et al., "Logic Minimisation of C-like Smart Contracts for Optimised Verifiable Computation," United Kingdom Patent Application No. 1718505.9, filed Nov. 9, 2017.
Covaci et al., "NECTAR: Non-Interactive Smart Contract Protocol using Blockchain Technology," arXiv preprint arXiv:1803.04860, Mar. 13, 2018, 8 pages.
Davidsen et al., "Empowering the Economy of Things," 2017, 54 pages.
Eberhardt et al., "ZoKrates—Scalable Privacy-Preserving Off-Chain Computations," Information Systems Engineering (ISE), Aug. 2018, 8 pages.
Ethereum Foundation, "ZoKrates—A Toolbox for zkSNARKS on Ethereum," https://www.youtube.com/watch?v=sSIrywb5J_0, Nov. 26, 2017, 12 pages.
Fee et al., "Cryptography using Chebyshev polynomials," Maple Summer Workshop, Burnaby, Canada, Jul. 11, 2004, http://www.cecm.sfu.ca/CAG/ppaers/CHEB, 16 pages.
Fiore et al., Hash First, Argue Later Adaptive Verifiable Computations on Outsourced Data, ACM Computer and Communications Security, 2016, 40 pages.
Fournet et al., "A Certified Compiler for Verifiable Computing," HAL Open Science, Jun. 2016, 14 pages.
Franz et al., "CBMC-GC: An ANSI C Compiler for Secure Two-Party Computations," retrieved from https://arise.or.at/pubpdf/CBMC-GC_An_Ansi_C_Compiler_for_Secure_Two-Party_Computations.pdf, 2014, 5 pages.
Fuchsbauer et al., "Proofs on Encrypted Values in Bilinear Groups and an Applicaiton to Anonymity of Signatures," Third International Conference on Pairing-based Cryptography, Aug. 2009, 26 pages.
Gennaro et al., "Quadratic Span Programs and Succint NIZKs without PCPs," Annual International Conference on the Theory and Applications of Cryptographic Techniques, May 26, 2013, 20 pages.
Gennaro et al., "Robust Threshold DSS Signatures," International Conference on the Theory and Applications of Cryptographic Techniques, May 12, 1996, https://link.springer.com/content/pdf/10.1007%2F3-540-68339-9_31.pdf, 18 pages.
Goldfeder et al., "Escrow Protocols for Cryptocurrencies: How to Buy Physical Goods Using Bitcoin," retrieved from http://stevengoldfeder.com/papers/escrow.pdf, Jul. 26, 2018, 27 pages.
Hajjeh et al., "TLS Sign," TLS Working Group, Internet Draft Version 4, Dec. 15, 2007 [retrieved May 2, 2018], https://tools.ietf.org/html/draft-hajjeh-tls-sign-04, 12 pages.
Hearn, "Continuing the zkSNARK Tutorials," retrieved from https://blog.plan99.net/vntinyram-7b9d5b299097, Dec. 15, 2016, 9 pages.
Hong et al., "Verifiable Computation of Large Polynomials," retrieved from http://or.nsfc.gov.cn/bitstream/00001903-5/154735/1/1000009080185.pdf, Dec. 16, 2014, 13 pages.

International Search Report and Written Opinion dated Jan. 15, 2019, Patent Application No. PCT/IB2018/058434, 11 pages.
International Search Report and Written Opinion dated Jan. 17, 2019, Patent Application No. PCT/IB2018/058437, 10 pages.
International Search Report and Written Opinion dated Jan. 22, 2019, Patent Application No. PCT/IB2018/058583, 10 pages.
International Search Report and Written Opinion dated Jan. 23, 2019, Patent Application No. PCT/IB2018/058433, 12 pages.
International Search Report and Written Opinion dated Jan. 23, 2019, Patent Application No. PCT/IB2018/058491, 12 pages.
International Search Report and Written Opinion dated Mar. 14, 2019, Patent Application No. PCT/IB2018/059770, 12 pages.
International Search Report and Written Opinion dated Mar. 19, 2019, Patent Application No. PCT/IB2018/059918, 14 pages.
Jehan, "Rockchain Decentralized Audited Data Networks," White Paper, retrieved from https://www.rockchain.org/RockchainWhitePaper.pdf, Jan. 20, 2018, 28 pages.
Kerber, "Verifiable Computation in Smart Contracts," University of Edinburgh School of Informatics Computer Science 4th Year Project Report, published online Apr. 4, 2017 [retrieved May 2, 2018], https://git.drwx.org/bsc/proj-report/raw/branch/master/report.pdf, 49 pages.
Kiayias et al., "Proofs of Proofs of Work with Sublinear Complexity," Financial Cryptography and Data Security, 2016, 18 pages.
Kosba et al., "Hawk: The Blockchain Model of Cryptography and Privacy-Preserving Smart Contracts," IEEE Symposium on Security and Privacy, May 22, 2016, 31 pages.
Kreuter, "Techniques for Scalable Secure Computation Systems," retrieved from https://repository.library.northeastern.edu/files/neu:cj82rh04k/fulltext.pdf, May 2018, 145 pages.
Król et al., "SPOC: Secure Payments for Outsourced Computations," Jul. 17, 2018, 6 pages.
Kumaresan et al., "How to Use Bitcoin to Incentivize Correct Computations," retrieved from https://people.csail.mit.edu/ranjit/papers/incentives.pdf, Nov. 2014, 12 pages.
Malkhi et al., "Fairplay—A Secure Two-Party Computation System," Aug. 2004, 17 pages.
Mathworks, "MATLAB Coder—Generate C and C++ Code From MATLAB Code," 9 pages.
Maxwell et al., "Chat logs," Bitcoin-wizards IRC Chat Channel, Aug. 16, 2013 [retrieved May 2, 2018], https://download.wpsoftware.net/bitcoin/wizards/2013/08/13-08-16.log, 1 page.
Maxwell et al., "CoinCovenants using SCIP signatures, an amusingly bad idea," Bitcoin Forum, Aug. 20, 2013 [retrieved Apr. 13, 2018], https://bitcointalk.org/index.php?topic=278122.0, 5 pages.
Turner, "CSE 260. Introduction to Digital Logic and Computer Design," Syllabus and Text Book, https://www.arl.wustl.edu/-jst/cse/260/ddc.pdf, 2015, 435 pages.

* cited by examiner

SYSTEM FOR SIMPLIFYING EXECUTABLE INSTRUCTIONS FOR OPTIMISED VERIFIABLE COMPUTATION

FIELD OF INVENTION

This invention relates generally to blockchain technologies, and more particularly to optimising and obfuscating a smart contract by converting the smart contract to an arithmetic circuit and minimising the arithmetic circuit. This invention further utilises cryptographic and mathematical techniques to enforce security in relation to electronic transfers conducted over a blockchain network. The invention is particularly suited, but not limited to, use in smart contract generation and execution.

BACKGROUND OF INVENTION

In this document, the term "blockchain" may refer to any of several types of electronic, computer-based, distributed ledgers. These include consensus-based blockchain and transaction-chain technologies, permissioned and unpermissioned ledgers, shared ledgers and variations thereof. The most widely known application of blockchain technology is the Bitcoin ledger, although other blockchain implementations have been proposed and developed. While the example of Bitcoin may be referred to as a useful application of the technology described in the present disclosure, for the purpose of convenience and illustration, Bitcoin is just one of many applications to which the technology described in the present disclosure may be applied. However, it should be noted that the invention is not limited to use with the Bitcoin blockchain; alternative blockchain implementations and protocols, including non-commercial applications, also fall within the scope of the present invention. For example, techniques described within the present disclosure would provide advantages to utilising other blockchain implementations that have limitations similar to Bitcoin regarding what constraints can be encoded within transactions, regardless whether an exchange of cryptocurrency occurs.

A blockchain is a peer-to-peer, electronic ledger which is implemented as a computer-based decentralised system made up of blocks which in turn may be made up of transactions and other information. In some examples, a "blockchain transaction" refers to an input message encoding a structured collection of field values comprising data and a set of conditions, where fulfilment of the set of conditions is prerequisite for the set of fields to be written to a blockchain data structure. For example, with Bitcoin each transaction is a data structure that encodes the transfer of control of a digital asset between participants in the blockchain system, and includes at least one input and at least one output. In some embodiments, a "digital asset" refers to binary data that is associated with a right to use. Examples of digital assets include Bitcoin, ether, and Litecoins. In some implementations, transferring control of a digital asset can be performed by reassociating at least a portion of a digital asset from a first entity to a second entity. Each block of the blockchain may contain a hash of the previous block to that blocks become chained together to create a permanent, unalterable record of all transactions which have been written to the blockchain since its inception.

In some examples, "stack-based scripting language" refers to a programming language that supports various stack-based or stack-oriented execution models and operations. That is, the stack-based scripting language may utilise a stack. With the stack, values can be pushed onto the top of the stack or popped from the top of the stack. Various operations performed to the stack can result in pushing or popping one or more of the values to or from the top of the stack. For example, an OP_EQUAL operation pops the top two items from the stack, compares them, and pushes a result (e.g., 1 if equal or 0 if unequal) to the top of the stack. Other operations performed to the stack, such as OP_PICK, may allow items to be selected from positions other than the top of the stack. In some scripting languages employed by some of the present embodiments, there may be at least two stacks: a main stack and an alternate stack. Some operations of the scripting language can move items from the top of one stack to the top of another stack. For example, OP_TOALTSTACK, moves a value from the top of the main stack to the top of the alternate stack. It should be noted that a stack-based scripting language, in some cases, may not be limited solely to operation in a strictly last-in-first-out (LIFO) manner. For example, a stack-based scripting language may support operations that copies or moves the n-th item in the stack to the top (e.g., OP_PICK and OP_ROLL respectively, in Bitcoin). Scripts written in a stack-based scripting language may be pushed onto a logical stack that can be implemented using any suitable data structure such as a vector, list, or stack.

In order for a transaction to be written to the blockchain, it must be "validated". Network nodes (mining nodes) perform work to ensure that each transaction is valid, with invalid transactions rejected from the network. A node can have standards for validity different from other nodes. Because validity in the blockchain is consensus based, a transaction is considered valid if a majority of nodes agree that a transaction is valid. Software clients installed on the nodes perform this validation work on transactions referencing an unspent transaction (UTXO) in part by executing the UTXO locking and unlocking scripts. If execution of the locking and unlocking scripts evaluates to TRUE and other validation conditions, if applicable, are met, the transaction is validated by the node. The validated transaction is propagated to other network nodes, whereupon a mining node can select to include the transaction in a blockchain. Thus, in order for a transaction to be written to the blockchain, it must be i) validated by the first node that receives the transaction—if the transaction is validated, the node relays it to the other nodes in the network; and ii) added to a new block built by a mining node; and iii) mined, i.e., added to the public ledger of past transactions. The transaction is considered to be confirmed when a sufficient number of blocks is added to the blockchain to make the transaction practically irreversible.

Although blockchain technology is most widely known for the use of cryptocurrency implementation, digital entrepreneurs have begun exploring the use of both the cryptographic security system Bitcoin is based on and the data that can be stored on the blockchain to implement new systems. It would be highly advantageous if the blockchain could be used for automated tasks and processes that are not limited to the realm of cryptocurrency. Such solutions would be able to harness the benefits of the blockchain (e.g., a permanent, tamper proof records of events, distributed processing etc.) while being more versatile in their applications.

The present disclosure describes technical aspects of one or more blockchain-based computer programs. A blockchain-based computer program may be a machine readable and executable program recorded in a blockchain transaction. The blockchain-based computer program may comprise rules that can process inputs in order to produce results, which can then cause actions to be performed dependent upon those results. One area of current research is the use of blockchain-based computer programs for the implementation of "smart contracts". Unlike a traditional contract which would be written in natural language, smart contracts may be computer programs designed to automate the execution of the terms of a machine-readable contract or agreement.

In embodiments, although interaction with specific entities can be encoded at specific steps in the smart contract, the smart contract can otherwise be automatically executed and self-enforced. It is machine readable and executable. In some examples, automatic execution refers to the execution of the smart contract that is successfully performed to enable transfer of the UTXO. Note that in such examples, "an entity" that is able to cause the transfer of the UTXO refers to an entity that is able to create the unlocking script without being required to prove knowledge of some secret. In other words, the unlocking transaction can be validated without verifying that the source of the data (e.g., an entity that created the unlocking transaction) has access to a cryptographic secret (e.g., private asymmetric key, symmetric key, etc.). In addition, in such examples, self-enforcement refers to the validation nodes of the blockchain network being caused to enforce the unlocking transaction according to the constraints. In some examples, "unlocking" a UTXO (also known as "spending" the UTXO) is used in the technical sense, referring to creating an unlocking transaction that references the UTXO and executes as valid.

A blockchain transaction output includes a locking script and information regarding ownership of digital assets such as Bitcoins. The locking script, which may also be referred to as an encumbrance, "locks" the digital assets by specifying conditions that are required to be met in order to transfer the UTXO. For example, a locking script could require that certain data be provided in an unlocking script to unlock the associated digital assets. The locking script is also known as "scriptPubKey" in Bitcoin. A technique for requiring a party to provide data to unlock a digital asset involves embedding a hash of the data inside the locking script. However, this presents a problem if the data is undetermined (e.g., not known and fixed) at the time the locking script is created.

The invention may be described as a verification method/system, and/or as a control method/system for controlling the validation of blockchain transactions. In some embodiments, a validated blockchain transactions results in recordation of the transaction on a blockchain, which in some applications, may result in an exchange or transfer of a digital asset via the blockchain. The digital asset may be a unit of a resource managed by a blockchain. Although the digital asset may, in some embodiments, be used as cryptocurrency, it is contemplated that the digital asset, in embodiments, is additionally or alternatively usable in other contexts. Note that the invention, while applicable to the control of digital assets, is technical in nature and can be used in other contexts that utilise blockchain data structures without necessarily involving the transfer of digital assets.

SUMMARY OF INVENTION

Thus, it is desirable to provide methods and systems that improve blockchain technology in one or more of these aspects. Such an improved solution has now been devised. Thus, in accordance with the present invention there is provided a method as defined in the appended claims.

Thus, it is desirable to provide a computer-implemented method, the computer-implemented method comprising:

converting a set of conditions encoded in a first programming language into a
programmatic set of conditions encoded in a second programming language;
precompiling the programmatic set of conditions into precompiled program code;
transforming the precompiled program code into an arithmetic circuit; and
reducing the arithmetic circuit to form a reduced arithmetic circuit.

The method may comprise the step of obtaining a set of conditions encoded in a first programming language. This may be performed prior to the conversion step.

The method may comprise the step of storing the reduced arithmetic circuit.

Reducing the arithmetic circuit may involve minimising the arithmetic circuit to produce the reduced arithmetic circuit.

The arithmetic circuit may be a directed acyclical graph. Additionally or alternatively, the directed acyclical graph may comprise a set of nodes representing logic gates and inputs. Additionally or alternatively, the directed acyclical graph may comprise a set of edges connecting the nodes representing wires between the logic gates and the inputs.

The arithmetic circuit may include a logic submodule that includes a proper subset of the set of nodes. Additionally or alternatively, reducing the arithmetic circuit may include reducing the logic submodule separately from the rest of the arithmetic circuit.

The wires between logic gates in the logic submodule may be 1-bit in width.

The arithmetic circuit may further include another logic submodule that includes another subset of the set of nodes. Additionally, the subset of nodes and the other subset of nodes may be nonintersecting. Additionally, reducing the arithmetic circuit may further include reducing the logic submodule using a first processor core in parallel with reducing the other logic submodule using a second processor core.

The computer-implemented method may also include allocating the logic submodule to the first processor core and allocating the other logic submodule to the second processor core in accordance with a heuristic for optimising computational resource usage.

The heuristic may be a longest processing time greedy algorithm.

Reducing the arithmetic circuit may include determining a set of prime implicants of the arithmetic circuit. Additionally, reducing the arithmetic circuit may include expressing the set of prime implicants as a product of sums that includes a first product term and a second product term. Additionally, reducing the arithmetic circuit may include simplifying the first product term and the second product term.

Simplifying the first product term and the second product term may be performed by applying a Boolean minimisation rule to the first product term and the second product term.

The second programming language may be C++.

The first programming language may be a computer programming language devised for composing machine-readable financial contracts.

The computer-implemented method may further include generating a quadratic program that includes a set of polynomials that describes the reduced arithmetic circuit. Additionally, the computer-implemented method may further include generating a set of parameters to be used by a node in a blockchain network in performance of the quadratic program.

It is also desirable to provide a system, comprising: a processor; and memory including executable instructions that, as a result of execution by the processor, causes the system to perform any of the methods as claimed.

It is also desirable to provide a non-transitory computer-readable storage medium having stored thereon executable instructions that, as a result of execution by one or more processors of a computer system, cause the computer system to at least perform any of the methods as claimed.

The invention can be described as a verification method/system, and/or as a control method/system for controlling the exchange or transfer of a digital asset via a blockchain. In some embodiments, the digital asset is a token or a portion of cryptocurrency. As explained below, the invention can also be described as a secure method/system for new, improved and advantageous ways of performing operations via a blockchain network or platform. Additionally or alternatively, the invention may provide an improved blockchain programming tool or aid. It may provide an improved, efficient and optimised arrangement that facilitates or enables distributed, verifiable computation.

BRIEF DESCRIPTION OF THE DRAWINGS

These and other aspects of the present invention will be apparent from and elucidated with reference to, the embodiment described herein. An embodiment of the present invention will now be described, by way of example only and with reference to the accompanying drawings, in which.

DETAILED DESCRIPTION

Figure 1:
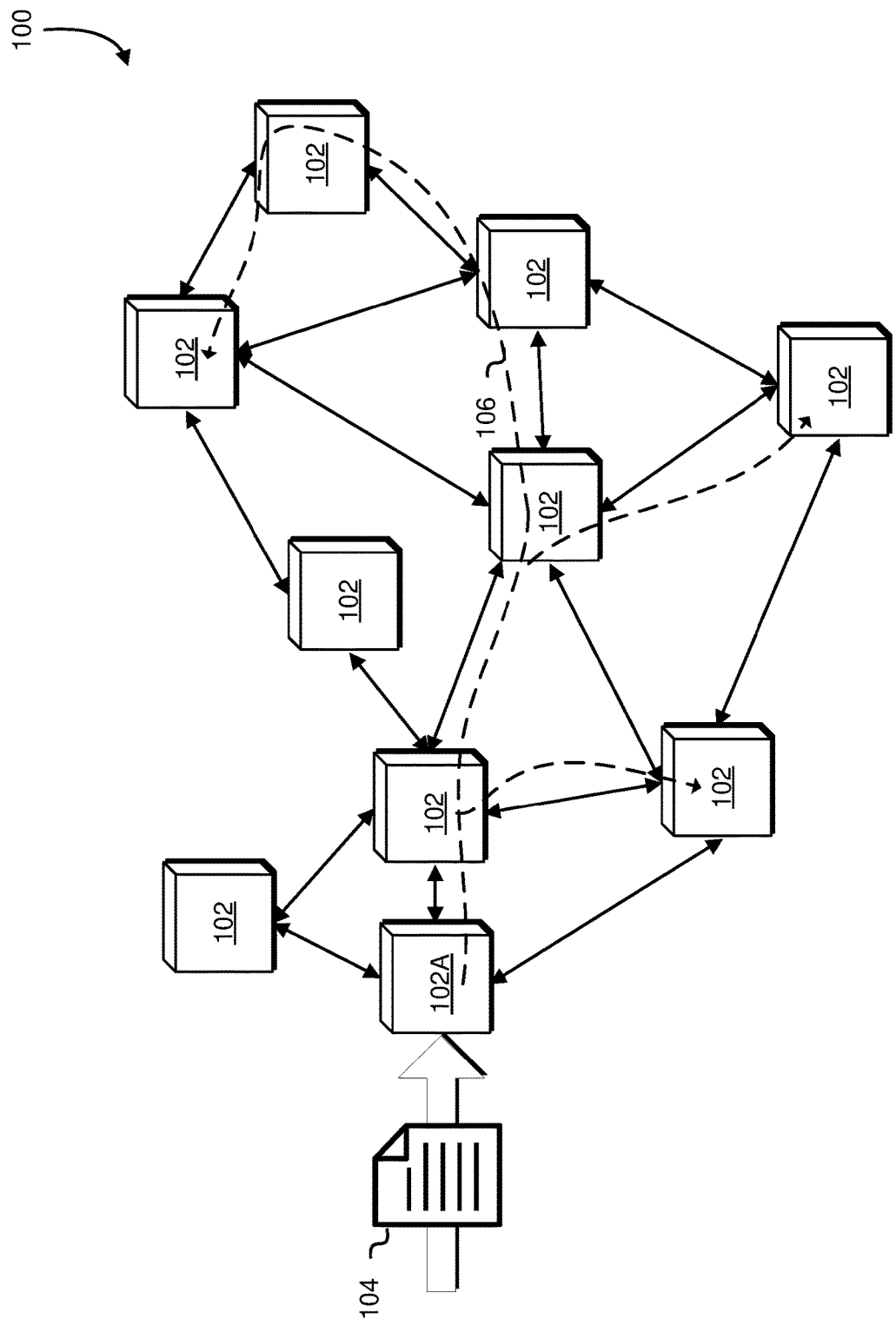
FIG. 1 illustrates a blockchain environment in which various embodiments can be implemented.

Reference will first be made to FIG. 1, which illustrates an example blockchain network 100 associated with a blockchain in accordance with an embodiment of the present disclosure. In the embodiment, the example blockchain network 100 comprises blockchain nodes that are implemented as peer-to-peer distributed electronic devices, each running an instance of software and/or hardware that performs operations that follow a blockchain protocol that is, at least in part, agreed to among operators of nodes 102. In some examples, "nodes" refers to peer-to-peer electronic devices that are distributed among the blockchain network. An example of a blockchain protocol is the Bitcoin protocol.

Figure 10:
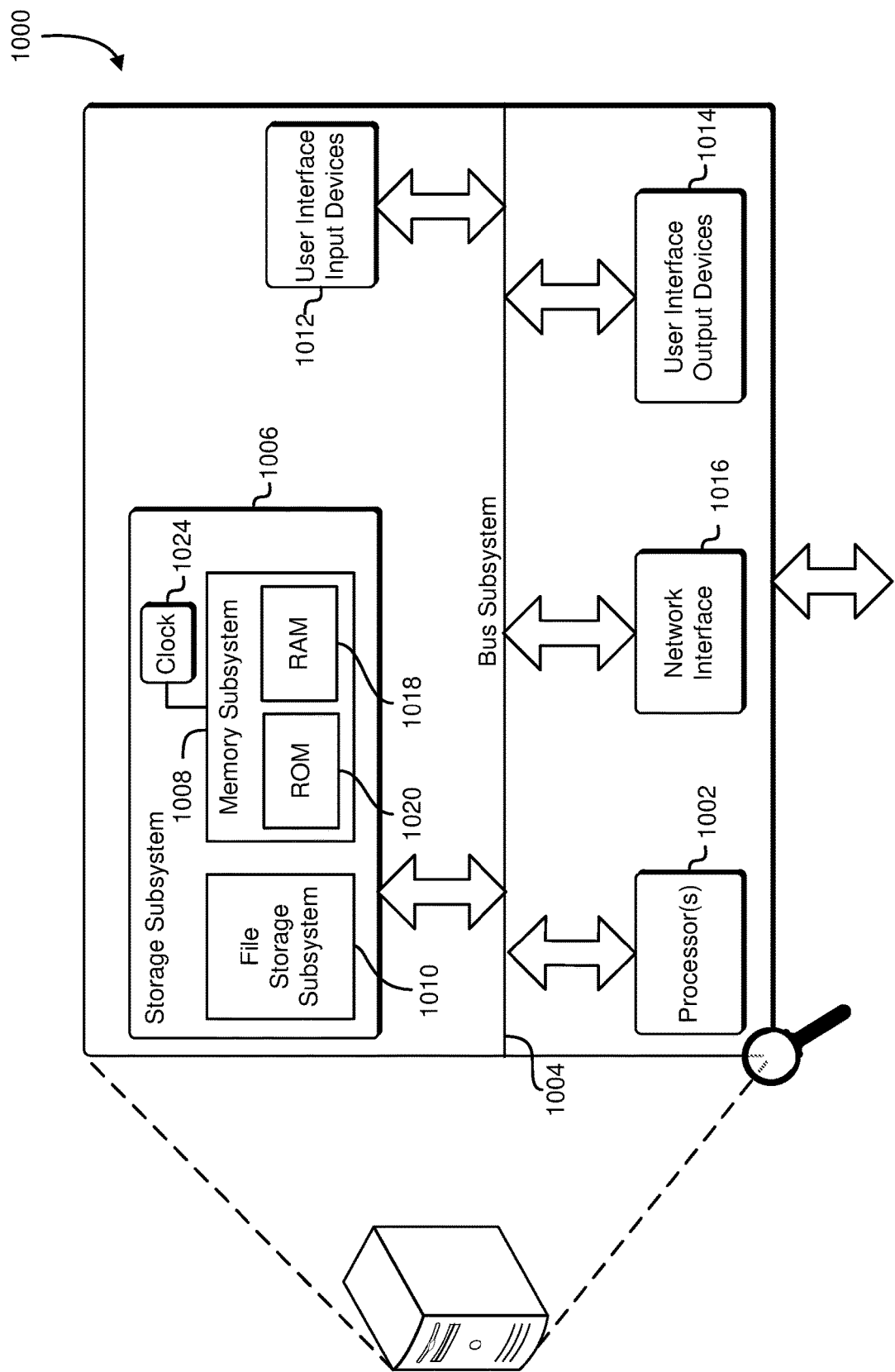
FIG. 10 illustrates a computing environment in which various embodiments can be implemented.

In some embodiments, the nodes 102 can be comprised of any suitable computing device (e.g., by a server in a data centre, by a client computing device (e.g., a desktop computer, laptop computer, tablet computer, smartphone, etc.), by multiple computing devices in a distributed system of a computing resource service provider, or by any suitable electronic client device such as the computing device 1000 of FIG. 10). In some embodiments, the nodes 102 have inputs to receive data messages or objects representative of proposed transactions, such as a transaction 104. The nodes, in some embodiments, are queryable for information they maintain, such as for information of a state of the transaction 104.

As shown in FIG. 1, some of the nodes 102 are communicatively coupled to one or more other of the nodes 102. Such communicative coupling can include one or more of wired or wireless communication. In the embodiment, the nodes 102 each maintain at least a portion of a "ledger" of all transactions in the blockchain. In this manner, the ledger would be a distributed ledger. A transaction processed by a node that affects the ledger is verifiable by one or more of the other nodes such that the integrity of the ledger is maintained.

As for which nodes 102 can communicate with which other nodes, it can be sufficient that each of the nodes in the example blockchain network 100 are able to communicate with one or more other of the nodes 102 such that a message that is passed between nodes can propagate throughout the example blockchain network 100 (or some significant portion of it), assuming that the message is one that the blockchain protocol indicates should be forwarded. One such message might be the publication of a proposed transaction by one of the nodes 102, such as node 102A, which would then propagate along a path such as a path 106. Another such message might be the publication of a new block proposed for inclusion onto a blockchain.

In an embodiment, at least some of the nodes 102 are mining nodes that perform complex calculations, such as solving cryptographic problems. A mining node that solves the cryptographic problem creates a new block for the blockchain and broadcasts the new block to others of the nodes 102. The others of the nodes 102 verify the work of the mining node and, upon verification, accept the block into the blockchain (e.g., by adding it to the distributed ledger of the blockchain). In some examples, a block is a group of transactions, often marked with a timestamp and a "fingerprint" (e.g., a hash) of the previous block. In this manner, each block may become linked to a previous block, thereby creating the "chain" that links the blocks in the blockchain. In embodiments, valid blocks are added to the blockchain by a consensus of the nodes 102. Also in some examples, a blockchain comprises a list of validated blocks.

In an embodiment, at least some of the nodes 102 operate as validating nodes that validate transactions as described in the present disclosure. In some examples, a transaction includes data that provides proof of ownership of a digital asset (e.g., a number of Bitcoins) and conditions for accepting or transferring ownership/control of the digital asset. In some examples, an "unlocking transaction" refers to a blockchain transaction that reassociates (e.g., transfers ownership or control) at least a portion of a digital asset, indicated by UTXO of a previous transaction, to an entity associated with a blockchain address. In some examples, a "previous transaction" refers to a blockchain transaction that contains the UTXO being referenced by the unlocking transaction. In some embodiments, the transaction includes a "locking script" that encumbers the transaction with conditions that must be fulfilled before ownership/control can be transferred ("unlocked").

In some embodiments, the blockchain address is a string of alphanumeric characters that is associated with an entity to which control of at least a portion of a digital asset is being transferred/reassociated. In some blockchain protocols implemented in some embodiments, there is a one-to-one correspondence between a public key associated with the entity and the blockchain address. In some embodiments, validation of transactions involves validating one or more conditions specified in a locking script and/or unlocking script. Upon successful validation of the transaction 104, the validation node adds the transaction 104 to the blockchain and distributes it to the nodes 102.

Figure 2:
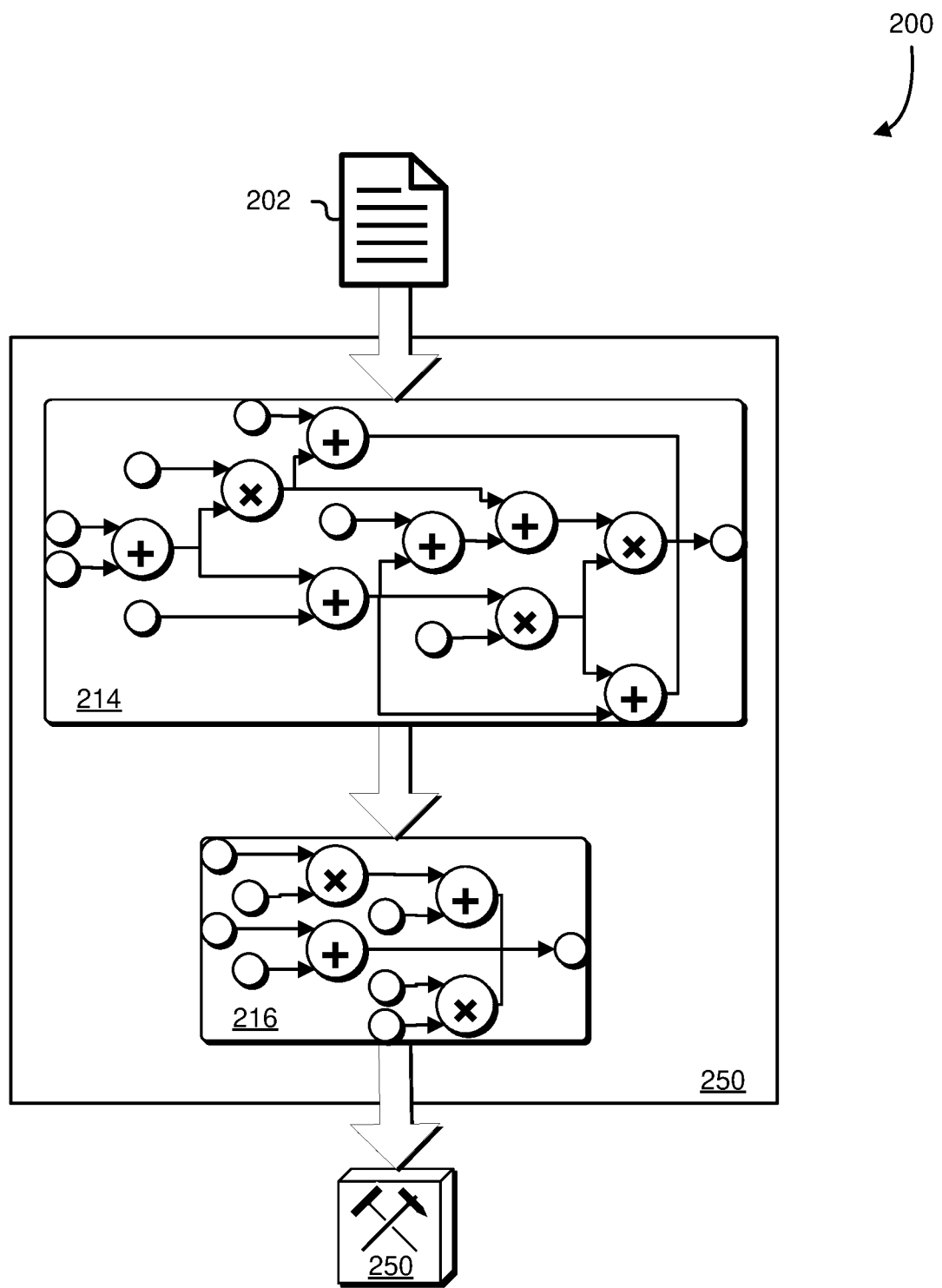
FIG. 2 illustrates an example of logic reduction in accordance with an embodiment.

FIG. 2 illustrates an example 200 of an embodiment of the present disclosure. Specifically, FIG. 2 depicts a smart contract 206 that is converted to an arithmetic circuit 214, which is then reduced by an arithmetic circuit optimisation module in order to reduce the required resources necessary for a worker node 250 in a blockchain to determine an outcome of the smart contract 206.

In an embodiment, the smart contract 202 is a contract or agreement written in a format that allows a computing device either to execute the terms of the contract and/or to determine whether the terms of the contract have been fulfilled. The smart contract 202 may include a set of rules and/or conditions that, as a result of being evaluated against a set of input values, allows a computing device to determine the outcome of the smart contract 202, which can then cause further actions to be performed dependent upon the outcome.

An object of the present disclosure is to describe a protocol that allows entities to compose the set of rules and/or set of conditions, such as that of the smart contract 202, using a domain-specific programming language. In some examples, a domain-specific programming language or "domain-specific language" (DSL) refers to a computer programming language designed for use in a particular field of use. Examples of DSLs include Hypertext Markup Language (HTML), Actulus Modeling Language (AML), Digital Asset Modeling Language (DAML), Financial Products Markup Language (FpML), and Emacs Lisp.

In some examples, a general-purpose programming language or "general-purpose language" (GPL), in contrast to a DSL, is broadly applicable. Examples of general-purpose programming languages include Ada, ALGOL, Assembly language, BASIC, Boo, C, C++, C#, Clojure, COBOL, Crystal, D, Dart, Elixir, Erlang, F #, Fortran, Go, Harbour, Haskell, Idris, Java, JavaScript, Julia, Lisp, Lua, Modula-2, NPL, Oberon, Objective-C, Pascal, Perl, PHP, Pike, PL/I, Python, Ring, RPG, Ruby, Rust, Scala, Simula, Swift, and Tcl. C++, which may be referred to in embodiments of the present disclosure, is a general-purpose programming language with imperative, object-oriented and general programming features, while also providing facilities for low-level memory manipulation.

In an embodiment, the arithmetic circuit 214 is a directed acyclical graph (DAG) that represents the smart contract 202. That is, the edges of the DAG ("wires") may represent input values or values between nodes in the graph and the nodes may represent arithmetic operations (e.g., sum, product, etc.). Thus, the input values to the arithmetic circuit 214 are associated with the input values to the smart contract and, in embodiments, the outcome of the smart contract matches the outcome of the arithmetic circuit 214. Note that in various embodiments, a match does not necessarily require equality. For example, two values may match if they are not equal but mathematically equivalent. As another example, two values may match if they correspond to a common object (e.g. value) or are in some predetermined way complementary and/or they satisfy one or more matching criteria. Generally, any way of determining whether there is a match may be used.

In an embodiment, the reduced arithmetic circuit 216 is the result of the arithmetic circuit having been reduced by the arithmetic circuit reducing module 220 according to Boolean minimisation rules or other mathematic equivalency rules. For example, in Boolean algebra, the expression u+uv can be simply minimised to u, and similarly the arithmetic circuit:

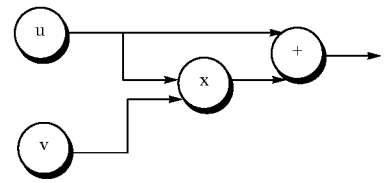

can be minimised to simply:

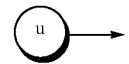

Thus, the arithmetic circuit reducing module 220 can reduce/simplify the arithmetic circuit 214 by evaluating the arithmetic circuit 214 for ways to reduce or minimise the circuit, thereby producing the reduced arithmetic circuit 216 that the arithmetic circuit reducing module 220 outputs.

In an embodiment, the arithmetic circuit reducing module 220 is hardware or software that, as a result of being executed, produces the reduced arithmetic circuit 216 by performing the operations of comparing the product terms in the arithmetic circuit 214 with Boolean minimisation rules or other mathematic equivalency rules in order to determine where and how the arithmetic circuit 214 can be reduced. Further details on the operations performed by the arithmetic circuit reducing module 220 are found in the descriptions of FIGS. 7-9.

Figure 3:
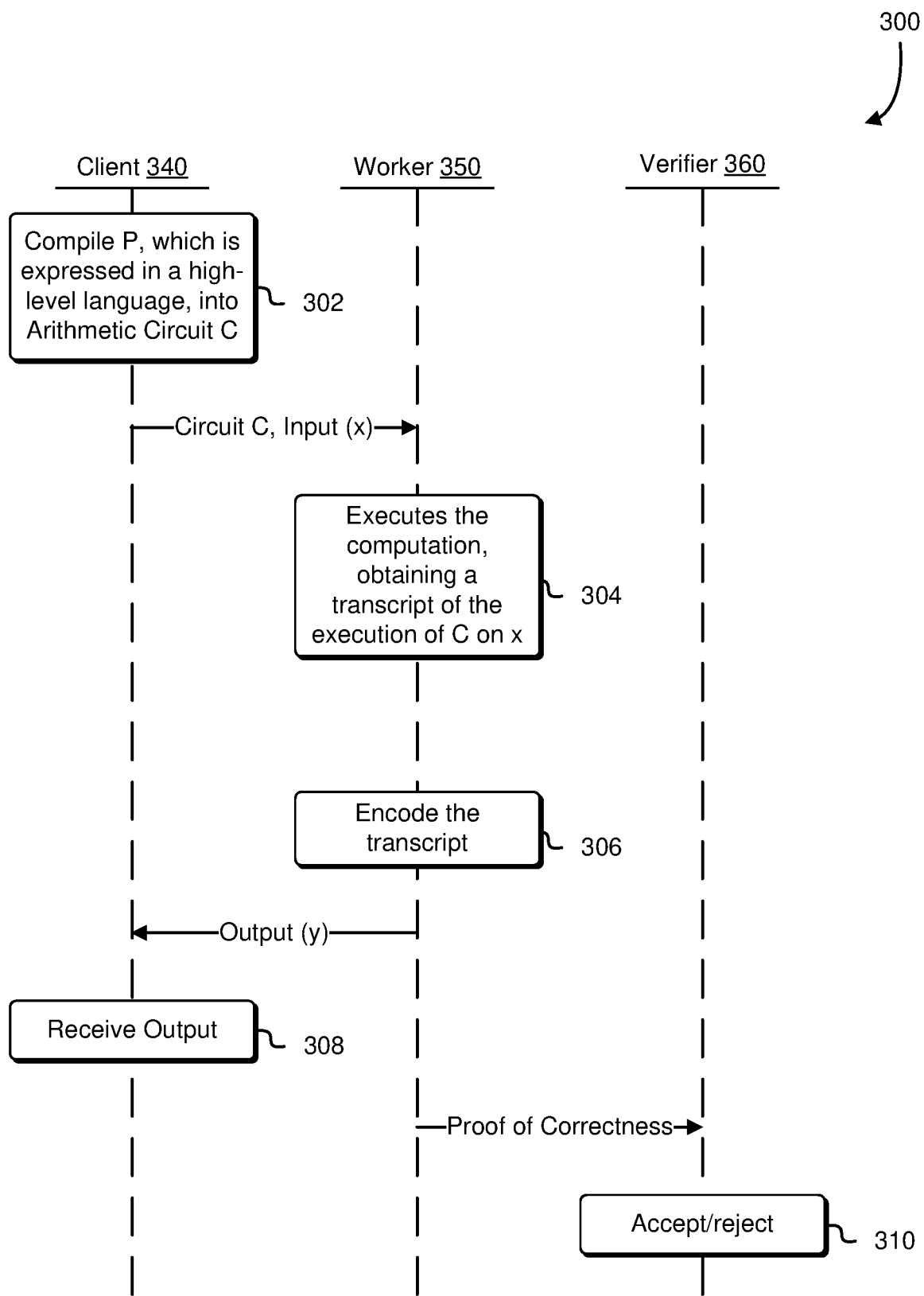
FIG. 3 is a swim diagram that illustrates an example of verifiable computation and actors involved in accordance with an embodiment.

In an embodiment, the worker node 250 is a node in a blockchain network, similar to the nodes 102 of FIG. 1 and the worker node 350 in FIG. 3. That is, the worker node 250 may be a computing device configured to process and/or validate blockchain transactions that is communicatively coupled to one or more other nodes in a blockchain network. The worker node 250, in some embodiments, may be designed to determine the output of an arithmetic circuit, such as the reduced arithmetic circuit 216, given a set of input values.

In embodiments, the execution of the contract can be outsourced to untrusted parties, while the correctness of the contract execution can be publicly verified. In embodiments, the protocol makes use of cryptographic primitives that ensure completeness, soundness, and zero-knowledge. In some examples, "completeness" refers to a verifier being able to determine the validity of the output if the prover follows the protocol correctly. In some examples, "soundness" refers to the inability of a prover to deceive a verifier as to the authenticity of the output. In some examples, "zero-knowledge" refers to the ability of a verifier to validate the output without being able to derive the inputs used to generate the output.

In this manner, a DSL designed to make smart contract writing and reading easier for humans without non-specialist programmers having to implement any cryptography themselves may be used to generate smart contracts. In embodiments of the present disclosure, a compiler/interpreter will automatically compile the DSL source code from a user to a cryptographic protocol usable with a blockchain. In the present disclosure, embodiments provide a highly optimised solution for the representation of a complex contract in terms of simple arithmetic gates. This representation can be seen as a solution or tool for the construction of a comprehensive pipeline able to provide a distributed verifiable computation.

FIG. 3 is a diagram illustrating an example of a process 300 of verifiable computation and actors involved in an embodiment of the present disclosure. As illustrated in FIG. 3, the process 300 of verifiable computation may include a client node 340, a worker node 350, and a verifier node 360 involved in performing steps in a verifiable computation protocol in an embodiment of the present disclosure. In embodiments, one or more of the client node 340, the worker node 350, or the verifier node 360 are nodes in a blockchain network such as the nodes 102 in the example blockchain network 100 of FIG. 1.

In an embodiment, a setup phase involves writing contracts in a DSL. An interpreter, which may be the client node 340, takes as input the source code and produces an arithmetic circuit C which consists of "wires" that carry values from a field IF and connect to addition and multiplication gates. Note that arithmetic circuit itself may be a DAG, rather than a hardware circuit, and the wires may be the edges in the DAG. However, it is contemplated that the arithmetic circuit could be embodied in a physical circuit having wires and logic gates. In 302, the client node 340 compiles a computation $\mathcal{P}$ written in a GPL into an arithmetic circuit $\mathcal{C}$. In the embodiment, the client node 340 supplies the arithmetic circuit $\mathcal{C}$ and the input x to the worker node 350.

From the circuit $\mathcal{C}$, an embodiment of the present disclosure can generate a quadratic program $Q\mathcal{Q}$ that includes a set of polynomials that provides a complete description of the original circuit $\mathcal{C}$. Then, public parameters may be generated to be used by the worker node 350 and the verifier node 360 in performing and verifying the quadratic program.

In 304, the worker node 350 executes the circuit $\mathcal{C}$ or the quadratic program Q on the input x and claims that the output is $\mathcal{Y}$. In some embodiments, the worker node 350 (i.e., the prover) is expected to obtain a valid transcript for $\{\mathcal{C},x,\mathcal{Y}\}$; thus, in 306 of the process 300, the worker node 350 encodes the transcript. In some examples, a valid transcript for $\{\mathcal{C},x,\mathcal{Y}\}$ is an assignment of values to the circuit wires such that the values assigned to the input wires are those of x, the intermediate values correspond to the correct operation of each gate in $\mathcal{C}$, and the values assigned to the output wire(s) is $\mathcal{Y}$; if the claimed output is incorrect (i.e., $\mathcal{Y} \neq \mathcal{P}(x)$), then a valid transcript for $\{\mathcal{C},x,\mathcal{Y}\}$ does not exist.

In 308, the worker node 350 provides the output $\mathcal{Y}$ to the client node 340. In embodiments, a public evaluation key EK and the public verification key VK are derived using a secret value s selected by or from the client node 340. In the embodiments, the worker node 350 uses these public keys to evaluate the computation on a particular input x. In embodiments, the output $\mathcal{Y}$, the values of the internal circuit wires, and EK are used to produce the proof-of-correctness π. The proof π can be stored on the blockchain and verified by multiple parties (e.g., the verifier node 360) without requiring the worker node 350 to separately interact with the multiple parties. In this manner, a verifier node 360 can validate the transaction in 310 using the public verification key VK and the proof π, thereby validating the contract.

Figure 4:
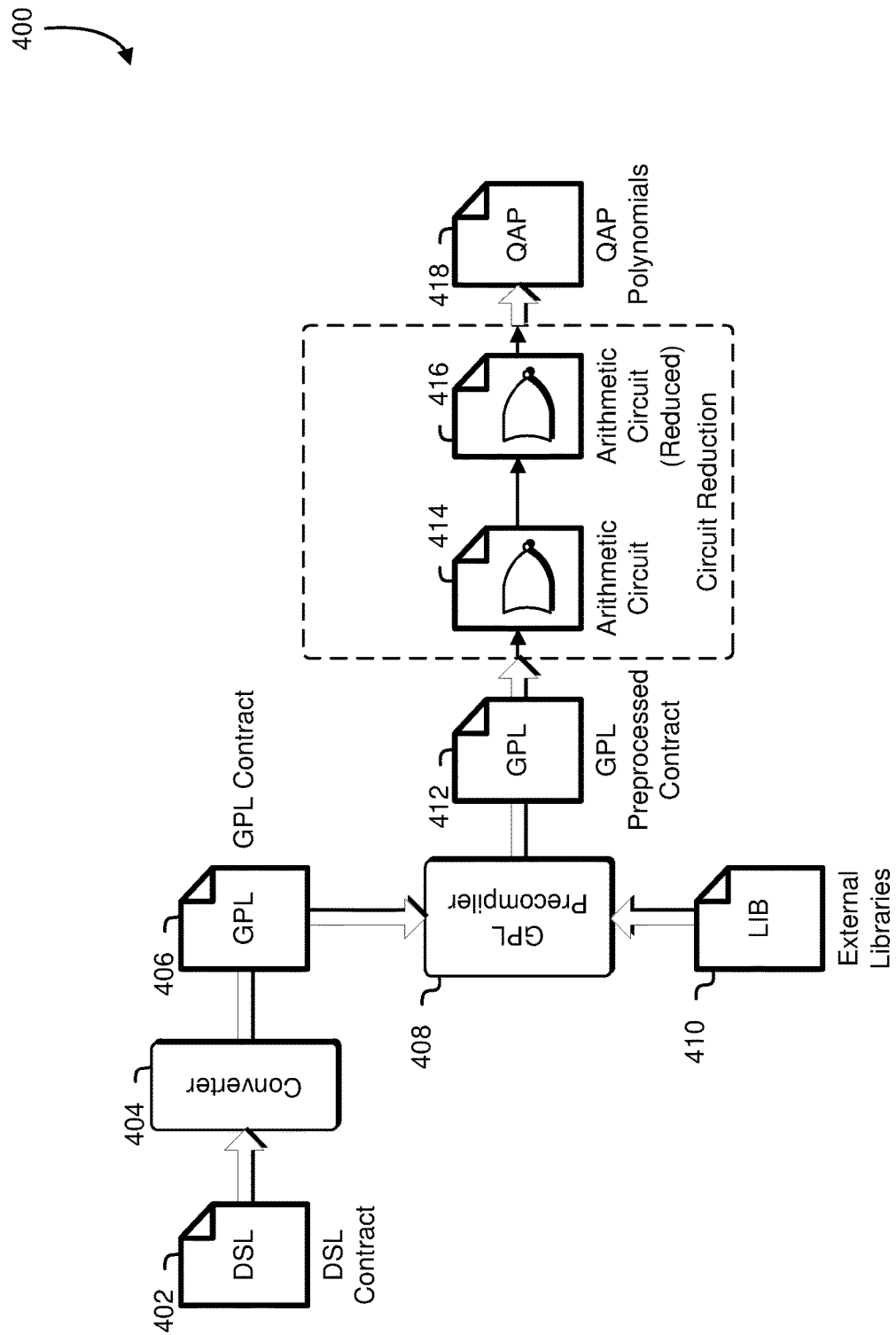
FIG. 4 illustrates an example of the workflow from domain-specific language contract to quadratic arithmetic program in accordance with an embodiment.

FIG. 4 illustrates an example 400 of the workflow from a smart contract encoded in a DSL to a quadratic arithmetic program (QAP) in accordance with an embodiment of the present disclosure. Specifically, FIG. 4 depicts a DSL smart contract 402 that is converted by a converter 404 into a GPL contract 406. A GPL precompiler 408 (also known as a pre-processor) incorporates external libraries 410 referenced by the GPL contract 406 to produce a GPL pre-processed contract 412. The GPL pre-processed contract 412 is transformed into an arithmetic circuit 414, which is optimised to produce a reduced arithmetic circuit 416 from which QAP polynomials 418 are derived.

In an embodiment, the DSL smart contract 402 is a contract written in a formal language having precise semantics. In embodiments, the DSL smart contract 402 includes a set of conditions, and the outcome of the DSL smart contract 402 depends on fulfilment of the set of conditions. An example of a smart contract is an insurance contract that takes, as input, a premium of an insuree and potential distribution to the insuree by an insurer. In the event the insuree suffers a loss (e.g., fulfilment of a first condition) during the term of the smart contract, execution of the smart contract distributes the premium to the insurer and dispenses the distribution for the loss to the insuree. On the other hand, in the event the insuree does not suffer a loss during the term of the smart contract, execution of the smart contract distributes the premium to the insurer and returns the potential distribution to the insurer.

In an embodiment, the converter 404 is a software program that, as a result of execution, receives a set of conditions, such as the DSL smart contract 402, written in a DSL and translates the DSL code into GPL source code, such as the GPL contract 406. In an embodiment, the GPL contract 406 is a GPL program, such as a C++ program, that contains the contract defined in the DSL smart contract 402.

In an embodiment, the GPL precompiler 408 is a computer-executable program that processes the GPL contract 406 and the required external libraries 410 to produce the stand-alone GPL pre-processed contract 412. In embodiments, the GPL precompiler 408 evaluates constant expressions and registers symbols found in the GPL contract 406.

In an embodiment, the external libraries 410 are collections of pre-written subroutines, functions, classes, containers, values, and/or variable types utilised by the GPL contract 406 by invocation. For example, by invoking the external libraries 410, the GPL contract 406 gains the functionality of that library without having to implement the functionality itself.

In an embodiment, the GPL pre-processed contract 412 includes a set of expressions and operators. The operators may include arithmetic operators (e.g., addition (+), multiplication (*), etc.), comparison operators (e.g., less than (<), equality (==), greater than or equal to (>=) etc.), conditional statements (e.g., if-then (?, :)), or logic operators (e.g., AND (&&), OR (81 ), NOT (!), XOR (⊕), etc.). In some embodiments, the main function is produced to have a predefined name and format.

In an embodiment, the arithmetic circuit 414 is a DAG over a set of variables. In an embodiment, every node of the DAG with an indegree of zero is an input gate representing a variable (e.g., $x_i$), and every other node of the DAG is a sum gate (+) or a product gate (×). In embodiments, every gate (node) has an outdegree of one, so the underlying graph is a directed tree. In embodiments, the arithmetic circuit 414 has two measures of complexity: size and depth. In some examples, a "size" of an arithmetic circuit is based on a number of gates within the arithmetic circuit 414. In some examples, "depth" of the arithmetic circuit is based on the length of the longest directed path within the arithmetic circuit.

After the arithmetic circuit 414 is generated, it may be reduced. In Boolean algebra, any Boolean function can be expressed in its minterm canonical form. For a function of n variables $f(x_i, x_n)$, a product term in which each of the variables appears once, in either its natural or complemented form, may be referred to as a minterm. That is, in some examples, a "minterm" is a logical expression of n variables that employs only the complement operator (') and the conjunction operator ( ). For example, abcd and ab'cd' are two minterms of f (a,b,c,d). In this manner, there will be $2^n$ f in n variables.

In some examples, an "implicant" refers to a product covering a group of minterms of f (i.e., a product term P in a sum of products is an implicant of f if f takes the value 1 whenever P equals 1. For example, for the following function:

$$f(a,b,c,d)=ab+bc'+d$$

ab, bc', abc', abc'd, and d are examples of implicants of f. In some examples, a "prime implicant" refers to an implicant that cannot be covered by a more general (e.g., with fewer literals) implicant. That is, a prime implicant is a product term P that results in a non-implicant for f if any literal is removed from P. Using the example above, abc'd is not a prime implicant because literals can be removed to make it prime (for abc'd to be a prime implicant, then f(a,b,c,d) must equal 1 only if a=1 and b=1 and c=0 and d=1.

However, as can be seen, f(a,b,c,d) can equal 1 if a, b, and c' are removed (i.e., if d=1). Likewise, f(a,b,c,d) can equal 1 if c' and d are removed (i.e., if ab=1). Similarly, f(a,b,c,d) can equal 1 if a and d are removed (i.e., if bc'=1). The process of removing literals from a Boolean term may be referred to as "expansion". Expanding by one literal doubles the number of input combinations for which the term is true. For example, abc' can be expanded to ab or bc' without changing the cover of f.

The sum of all prime implicants of a Boolean function may be referred to as a "Blake canonical form". The prime implicants that cover an output of the function that no combination of other prime implicants is able to cover may be referred to as "essential prime implicants". The number of prime implicants of a logic function with n input variables can be as large as $3^n/n$. An extraction of a minimum prime cover is known to belong to the class of nondeterministic polynomial time-complete (NP-complete) problems. The following method illustrates one example of building a chart of prime implicants using a Quine-McCluskey algorithm.

The Quine-McCluskey algorithm found in McCluskey, *Minimization of Boolean Functions* (1956) returns a complete list of prime implicants of a Boolean function. In an embodiment, the prime implicants returned are used to build a prime implicant table, which may be used as the input to one or more algorithms for the extraction of the essential prime implicants of the function. A Boolean function $f(x_1, \ldots, x_n)$ to be reduced can be expressed as:

$$f(x_1, \ldots, x_n) = \sum_{i}^{M} m_i(v_i)$$

The M minterms $m_i$, used to express f to give output 1 are included in the index vector v. Each index $v_i$ represents the binary encoding of a given input sequence:

$$v_i = \sum_{i=1}^{n} x_i 2^{i-1}$$

Therefore, each minterm in v can be expressed as product of natural or complemented inputs depending on the $x_i$ values. Pairs of minterms can be combined if their representation varies by a single digit changing. Terms that cannot be combined further are prime implicants. The essential prime implicant table is constructed using the list of irreducible prime implicants.

In an example, given a Boolean function $f(x_1, \ldots, x_n)$ with n=4, M=6, and v={4,8,10,11,12,15}, the Quine-McCluskey algorithm to extract the prime implicants to produce the prime implicant table would appear as follows:

$$f(a, b, c, d) = \sum_{i=1}^{M} m(4, 8, 10, 11, 12, 15)$$

Therefore, f can be expressed as sum of the following minterms:

$m_4 = f(0,1,0,0) = a'bc'd'$ $m_8 = f(1,0,0,0) = ab'c'd'$ $m_{10} = f(1,0,1,0) = ab'cd'$ $m_{11} = f(1,0,1,1) = ab'cd$ $m_{12} = f(1,1,0,0) = abc'd'$ $m_{15} = f(1,1,1,1) = abcd$ In case of 4 inputs, minterms are in the range $[m_0, m_{15}]$, where $m_0 = f(0,0,0,0)$ and $m_{15} = f(1,1,1,1)$. The canonical sum of products expression for f is the following:

$$f(a,b,c,d) = a'bc'd' + ab'c'd' + ab'cd' + ab'cd + abc'd' + abcd$$

Minterms are combined when a single digit changes, and the corresponding input is set to "-". This results in size-2 implicants:

$m_{4,12} = f(-,1,0,0)$ [irreducible]

$m_{(8,9)} = f(1,0,0,-)$ $m_{8,10} = f(1,0,-,0)$ $m_{8,12} = f(1,-,0,0)$ $m_{9,11} = f(1,0,-,1)$ $m_{10,11} = f(1,0,1,-)$ $m_{10,14} = f(1,-,1,0)$ $m_{12,14}=f(1,1,-,0)$ $m_{11,15}=f(1,-,1,1)$ $m_{14,16}=f(1,1,1,-)$

Some of the size-2 implicants may not be irreducible, but may be combined again resulting in size-4 implicants:

$m_{8,9,10,11}=f(1,0,-,-)$ [irreducible]

$m_{8,10,12,14}=f(1,-,-,0)$ [irreducible]

$m_{10,11,14,15}=f(1,-,1,-)$ [irreducible]

This time all the size-4 implicants are irreducible. The list of irreducible implicants corresponds to the prime implicants of the Boolean function. As last step, the essential prime implicant table may be constructed using the list of prime implicants. An example of a prime implicant table is shown in table 1 below:

TABLE 1

| Prime implicants | Index vector v | | | | | Input variables x | | | |
|---|---|---|---|---|---|---|---|---|---|
| | 4 | 8 | 10 | 11 | 12 | 15 | a | b | c | d |
| $m_{4,12}$ | ✔ | | | | ✔ | | — | 1 | 0 | 0 |
| $m_{8,9,10,11}$ | | ✔ | ✔ | ✔ | | | 1 | 0 | — | — |
| $m_{8,10,12,14}$ | | ✔ | ✔ | | ✔ | | 1 | — | — | 0 |
| $m_{10,11,14,15}$ | | | ✔ | ✔ | | ✔ | 1 | — | 1 | — |

A "tick" in the table corresponds to a prime implicant requiring a given index vector; that is, a given input sequence, in order to be true. If a column of v has only one tick, then the corresponding minterm can be covered by one prime implicant only. Such prime implicant is essential for f.

In an embodiment, the reduced arithmetic circuit 416 is a reduced or minimised directed acyclical graph (DAG) that can be used to determine the outcome of a set of conditions, such as those specified in the DSL smart contract 402, given a set of inputs. In some embodiments the reduced arithmetic circuit 416 is a minimised (i.e., reduced to the smallest degree) arithmetic circuit. In some embodiments, the most optimal arithmetic circuit may not necessarily be the smallest arithmetic circuit (e.g., certain larger arithmetic circuit may be evaluated more quickly than larger arithmetic circuits depending on the number and types of arithmetic operations in the circuit), and in such embodiments the reduced arithmetic circuit 416 is an optimised (e.g., for maximum speed, less memory usage, most efficient processor utilisation, etc.), but not necessarily minimised, arithmetic circuit.

In an embodiment, the QAP polynomials 418 are one or more expressions comprising variables and coefficients expressed in a mathematical formula that provides a complete description of the original arithmetic circuit (e.g., arithmetic circuit 414 of FIG. 4). In embodiments, the polynomials of the QAP polynomials are defined in terms of their evaluations at the roots of the arithmetic circuit such as described in Gennaro, R. et al., *Quadratic Span Programs and Succint NIZKs without PCPs* (2013). In embodiments, the QAP polynomials are encoded into a locking script of a blockchain transaction as a representation of the smart contract. In embodiments, the locking script, upon execution, receives a set of parameter values (e.g., as a result of execution of a locking script), which are input as variables into the QAP polynomials to cause the result of the smart contract to be determined.

In embodiments, the GPL precompiler 408 produces the GPL pre-processed contract 412, which may be an arithmetic circuit comprised of arithmetic gates. Note, however, that complex arithmetic circuits also embed logic submodules because of conditional and flow control statements. In embodiments, these submodules are still converted to arithmetic circuits, but they are characterised by 1-bit width gate connections, as can be seen in FIG. 5.

Figure 5:
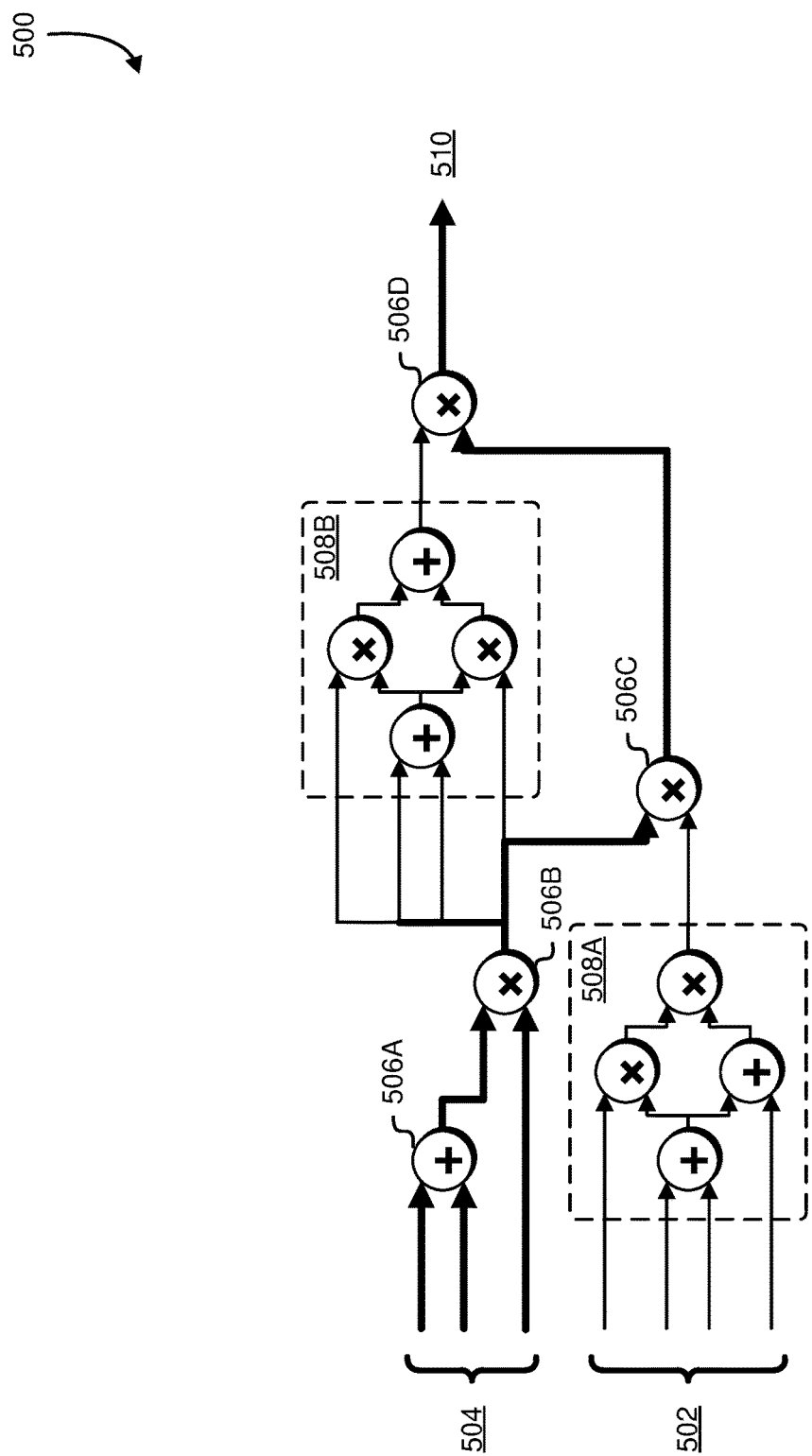
FIG. 5 illustrates an example of an arithmetic circuit containing logic submodules in accordance with an embodiment.

FIG. 5 illustrates an example model of an arithmetic circuit 500 containing logic submodules of an embodiment of the present disclosure. As illustrated in FIG. 5, the arithmetic circuit 500 may include 1-bit inputs 502 and groups of inputs 504 that pass into logic submodules 508A-08B and/or ungrouped arithmetic gates 506A-06D to produce an output 510. The thick lines in FIG. 5 represent groups of 1-bit width wires (e.g., a bus) and the thin lines represent 1-bit bit wires. Because logic and arithmetic 1-bit width circuits are dual (e.g., can be expressed in at least two ways—as a product of sums or as a sum of products), logic circuit reduction can be applied to the logic submodules 508A-08B in the arithmetic circuit 500.

Each of the logic submodule s*508A-08B may comprise proper (strict) subsets of the set of nodes in the arithmetic circuits. In other words, a logic submodule may not encompass the entirety of the arithmetic circuit. Furthermore, in some embodiments the logic submodules*508A-08B are nonintersecting; i.e., in such embodiments the logic submodules*508A-08B would not share any internal gates. Moreover, because the logic submodules 508A-08B do not share any internal gate in such embodiments, the reduction procedure can be parallelised (e.g., each of the logic submodules 508A-08B can be reduced in parallel) to reduce the time complexity of the operation.

In an embodiment, the 1-bit inputs 502 are wires that can carry a value representative of either 1 or 0, whereas the groups of inputs 504 represent a plurality of 1-bit wires. Complex arithmetic circuits may embed logic submodules derived from conditional and flow control statements. In embodiments, these logic submodules are also converted to arithmetic circuits, but may be characterised by 1-bit width gate connections, such as the logic submodules 508A-08B depicted. In some embodiments, the wires in the logic submodules 508A-08B are 1-bit width only.

Because logic and arithmetic 1-bit width circuits are dual, logic reduction may also be applied to the logic submodules 508A-08B. Moreover, because the logic submodules 508A-08B do not share any internal gate, the reduction procedure may be parallelised to reduce the time complexity of the arithmetic circuit 500; for example, separate processor cores may be allocated to perform logic reduction on each of the logic submodules 508A-08B. In an embodiment, a computationally optimised heuristic may be utilised to assign the logic submodules 508A-08B to different processing cores for logic reduction. The computationally optimised heuristic may be a heuristic designed to optimise computational resource usage. One example of a computationally optimised heuristic that may be used is the longest processing time (LPT) greedy algorithm. In such a heuristic, if the logic submodules 508A-08B are sorted by processing time and assigned to the machine with the earliest end time so far, the scheduler tries to balance the computational load for each transaction. Further details may be found below in the description of FIG. 7. In contrast, in embodiments, the ungrouped arithmetic gates 506A-06D may not be reduced in parallel because the ungrouped arithmetic gates 506A-06D are shared by a groups of 1-bit wires, such as the groups of inputs 504. Note that in embodiments, reduction applies to the number of gates but the number of inputs (e.g., the 1-bit inputs 502 and the group of inputs 504) remain the same.

In an embodiment, the output 510 is a result of the operations performed on the inputs 502 and 504 in accordance with the arithmetic circuit 500. In some embodiments, the result is a value of true or false. In other embodiments, the result is a set of one or more 1-bit values. In other embodiments, the result may be any other value or value supported by the arithmetic circuit.

As described above, in embodiments, the Quine-McCluskey algorithm can return the complete list of prime implicants of a Boolean function f. Moreover, the method described in Petrick, *A Direct Determination of the Irredundant Forms of a Boolean Function from the Set of Prime Implicants* (1956) (Petrick's method) can be used to reduce the number of prime implicants in order to represent f as a composition of essential prime implicants as described below.

Boolean function f represented in a prime implicant table (e.g., the prime implicant table 1) can be expressed in a dual form using an auxiliary Boolean function f*. The auxiliary Boolean function f* true when all the columns of the prime implicant table are covered. Consequently, f* can be expressed as product of the sums $\sigma_i$ of the prime implicants contributing to each index vector $v_i$ (i.e., contributing to each output of f):

$$f^* = \prod_{i=1}^{M} \sigma_i$$

For example, the list of $\sigma_i$ terms for the prime implicants in table 1 becomes the following:

$\sigma_0 = \sigma(v_0=4) = bc'd'$ $\sigma_1 = \sigma(v_1=8) = ab'+ad'$ $\sigma_2 = \sigma(v_2=10) = ab'+ad'+ac$ $\sigma_3 = \sigma(v_3=11) = ab'+ac$ $\sigma_4 = \sigma(v_4=12) = bc'd'+ad'$ $\sigma_5 = \sigma(v_5=15) = ac$ Therefore, the dual function f* becomes:

$f^* = (bc'd')(ab'+ad')(ab'+ad'+ac)(ab'+ac)(bc'd'+ad')(ac)$

If we let $z_i$ represent an individual minterm in f*, the function can be rewritten as:

$f^* = z_0(z_1+z_2)(z_1+z_2+z_3)(z_1+z_3)(z_0+z_2)z_3$

Boolean functions can be further simplified using certain Boolean rules, such as the rules shown below:
1. u+uv=u
2. u+u'v=u+v
3. (u+v)(u+w)=u+vw Note that other Boolean simplification rules exist, and it is contemplated as within the scope of the present disclosure that fewer, more, or different Boolean simplification rules may be used in embodiments of the present disclosure. However, using the rules above, the following simplifications can be performed on f*:

$(z_1+z_2)(z_1+z_3) = z_1+z_2z_3$ (rule 3)

$z_0(z_0+z_2) = z_0$ (rule 1)

By applying few more simplifications to f*, f* may undergo the following reductions:

$f^* = z_0z_3(z_1+z_2z_3)(z_1+z_2+z_3)$ $f^* = z_0z_3(z_1z_1+z_1z_2z_1z_3+z_1z_2z_3+z_2z_2z_3+z_2z_3z_3)$ $f^* = z_0z_3(z_1z_1z_2z_1z_3z_1z_2z_3+z_2z_3+z_2z_3)$ $f^* = z_0z_3(z_1+z_2z_3)$ $f^* = z_0z_1z_3+z_0z_2z_3$

Thus, function f* can be covered by $z_0z_1z_3$ and $z_0z_2z_3$, and both terms contain the minimum number of minterms (considering a different dual function $f^*=z_0z_1z_3+z_0z_2$, the term $z_0z_2$ will be used to represent f because of the smaller number of minterms). Therefore, f can be simplified as:

$f = z_0+z_1+z_3 = bc'd'+ab'+ac$ or, alternatively:

$f = z_0+z_2+z_3 = bc'd'+ad'+ac$

In this manner, an auxiliary Boolean function f* can be expressed as product of the sums $\sigma_i$ of the prime implicants contributing to each output of f:

$$f^* = \prod_{i=1}^{M} \sigma_i$$

where M is the number of minterms used to express f and terms $\sigma_i$ are represented as follows:

$$\sigma_i = \sum_{k=1}^{|z_i|} z_{ik}$$

Therefore, $z_{ik}$ represents the k-th prime implicant contributing to the sum $\sigma_i$.

Figure 6:
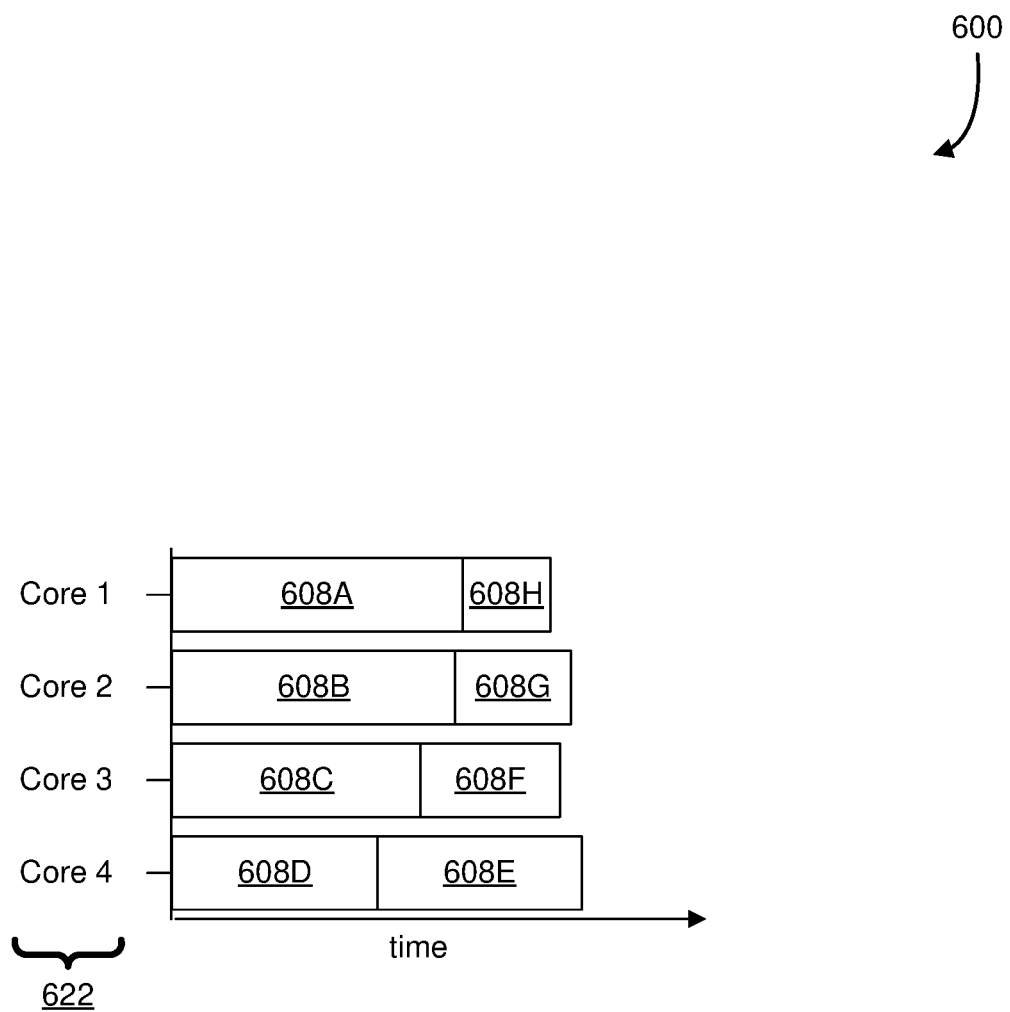
FIG. 6 illustrates an example of processing logic submodules in parallel in accordance with an embodiment.

$\sigma_1 = z_{11}+z_{12}+ \ldots +z_{1|z_1|}$ $\sigma_2 = z_{21}+z_{22}+ \ldots +z_{2|z_2|}$ $\sigma_M = z_{M1}+z_{M2}+ \ldots +z_{M|z_M|}$ FIG. 6 illustrates an example 600 of reducing logic submodules in an embodiment of the present disclosure. Specifically, FIG. 6 depicts an illustrative example of a system processing eight logic submodules 608A-08H using four processor cores 622. In the example 600, an LPT greedy algorithm is used with the goal being for all of the processor cores to finish processing as near to the same time as possible in order to optimise the processor usage of the system. Initially, the logic submodules 608A-08H may ordered by complexity (e.g., number of logic gates in the logic submodules 608A-08H) as an estimate of the processing time of the logic submodules 608A-08H relative to each other. It is contemplated, however, that other methods of estimating processing time for the logic submodules 608A-08H may be used.

In the example 600, the first four logic submodules 608A-08D having the longest estimated processing time may be distributed in a round robin or pseudorandom fashion among the processor cores 622. As can be seen, the logic submodule 608D being processed by core 4, having the smallest estimated processing time of the four, finishes first. Consequently, core 4 is allocated the unprocessed logic submodule having the fifth longest estimated processing time, which is logic submodule 608E. Core 3 finishes processing logic submodule 608C next, and it is allocated the logic submodule with the sixth longest estimated processing time, logic submodule 608F. Core 2 finishes processing logic submodule 608B, and receives logic submodule 608G. Finally, core 1 finishes processing the logic submodule with the longest estimated processing time, and receives the logic submodule having the shortest estimated processing time of the eight logic submodules 608A-08H, logic submodule 608H. As can be seen in the example 600, all four processor cores 622 finish processing the eight logic submodules 608A-08H near to the same time, resulting in reduced processor idle time.

Figure 7:
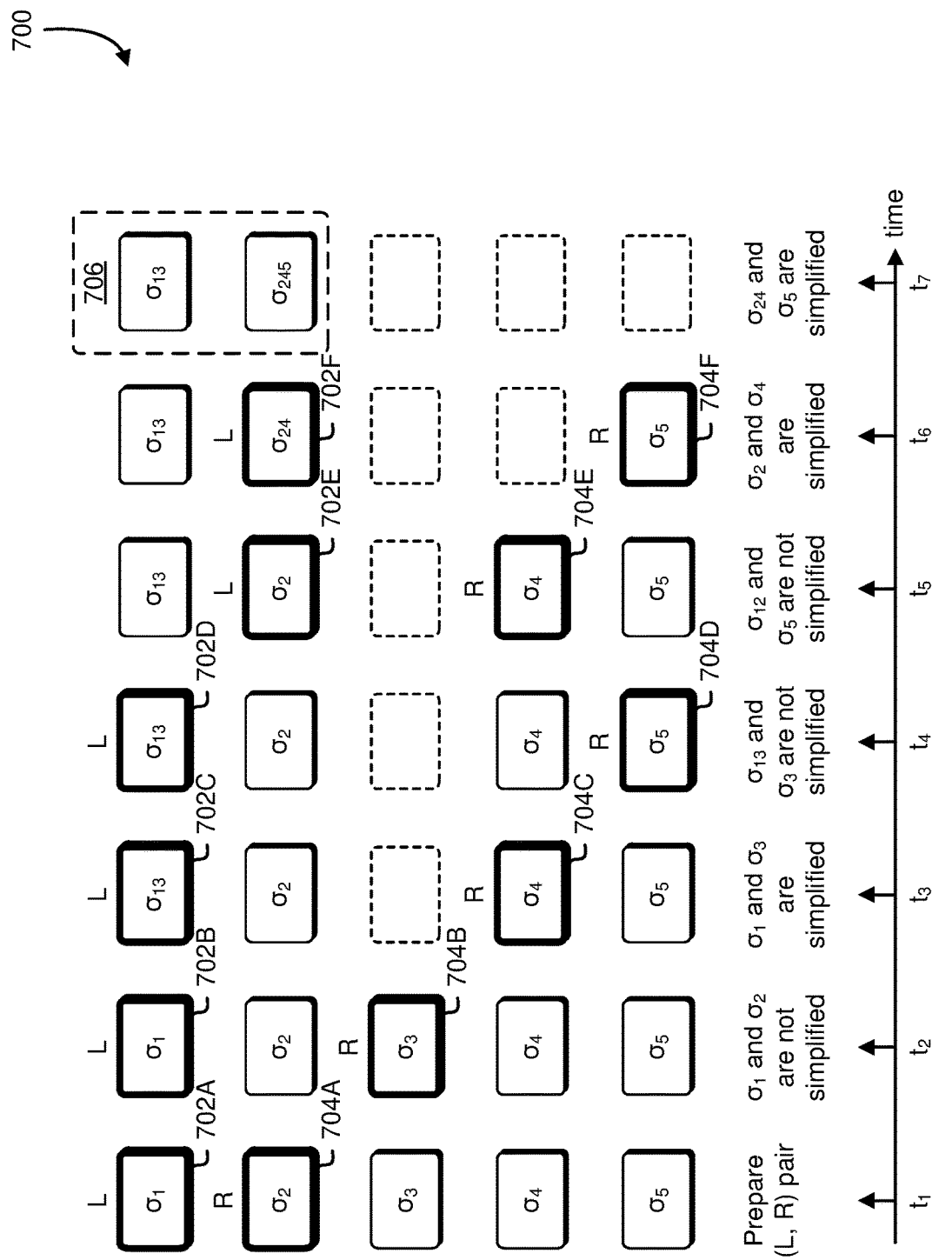
FIG. 7 illustrates an example of prime implicant reduction in accordance with an embodiment.

FIG. 7 illustrates an example 700 of prime implicant reduction of an embodiment of the present disclosure. Specifically, FIG. 7 depicts a set of prime implicants $\sigma_1$ to $\sigma_5$ that are simplified according to the steps described above, such as by the arithmetic circuit reducing module 220 of FIG. 2. For example, consider the product terms $\sigma_i$ as a list $\{\sigma_1, \ldots, \sigma_M\}$. In embodiments, at each step, two members of the list are compared (referred to as "left" and "right" members) and simplified if possible. In the example 700, at time $t_1$ the left member 702A ($\sigma_1$) is paired with the right member 704A ($\sigma_2$) and the product terms of f* are simplified using Boolean simplification rules, such as those listed above. If the left member 702A and the right member 704A can be simplified, then the left member will be substituted with a new term $\sigma_{12}$. However, in the example 700 it can be seen that the left member 702A and the right member 704A cannot be simplified further.

Subsequently, at time $t_2$, the left member 702B ($\sigma_1$) is joined with the right member 704B ($\sigma_3$) and processed according to the Boolean simplification rules. In this case, it can be seen in the example 700 that the left member 702B and the right member 704B can be simplified to $\sigma_{13}$. Thus, at time $t_3$, the left member 702C ($\sigma_{13}$) is compared with the right member 704C ($\sigma_4$). In the example 700, the left member 702C and the right member 704C cannot be simplified further.

Similarly, at time $t_4$, the left member 702D and the right member 704D ($\sigma_5$) likewise cannot be simplified further. After all right members are checked, the left member is set to its next member in the list, in the example 700 the next member is $\sigma_2$. Consequently, at time $t_5$, the left member 702E ($\sigma_2$) is joined with the right member 704E ($\sigma_4$) and, in accordance with the Boolean simplification rules, they simplified to $\sigma_{24}$, which becomes the value of the left member. Therefore, at time $t_6$, the left member 702F ($\sigma_{24}$) is joined with the right member ($\sigma_5$), processed, and simplified to $\sigma_{245}$. The process ends when no more checks are available, which is seen at time $t_7$.

In embodiments, the number of simplification steps is upper bounded by $$\frac{M(M-1)}{2}.$$

In the embodiments, each simplification step for a pair (left, right) consists in the execution of the following operations:
1. Attempt to simplify (left, right) according to rule 1,
2. Attempt to simplify (left, right) according to rule 2,
3. Attempt to simplify (left, right) according to rule 3.

In the embodiments, the u term in rules 1, 2, and 3 represents the common part in the (left, right) pair. A crosscheck (intersection) between the addends of left and right members in the embodiments is characterised by a time complexity $O(n^2)$ or $O(n \log n)$, depending on the specific implementation (e.g., naive or sorted lists).

In embodiments, after the simplification process is completed, the remaining product terms $\sigma_i$ can be represented in explicit form as sum of p terms a* with time complexity $O(1)$. Thus, function f* may be covered by each term independently:

$$f^* = \sigma^*_0 + \sigma^*_1 + \ldots + \sigma^*_p$$

Note that the value of p depends on the number of successful simplification operations. In embodiments, since each of terms $\sigma_i^*$ is actually a product of prime implicants $z_i$, function f* can be covered by the minterm $\sigma_L^*$ in $\sigma^*$ containing the minimum number of prime implicants:

$$f^* = \sigma^*_L$$

where $L = \mathrm{argmin}_i C(\sigma_i^*)$ and function $C(\sigma_i^*)$ counts the number of prime implicants $z(\sigma_i^*)$ contained in $\sigma_i^*$. Finally, the dual function f may be expressed as follows:

$$f = \sum_{k=1}^{C(\sigma_L^*)} z_k(\sigma_L^*)$$

In embodiments, it is contemplated that individual logic submodules, such as the logic submodules 508A-08B of FIG. 5, may be simplified in parallel by different processing cores for faster processing. In such embodiments, a computationally optimised heuristic is performed by a scheduler to assign the individual logic submodules to different processing cores for the logic reduction stage, called a LPT greedy algorithm. If the jobs are sorted by their processing time and then assigned to the machine (processing core) with the earliest end time so far, the scheduler tries to balance the computational load for each logic submodule being processed.

In embodiments, the number of initial gates $g_i$ of a logic submodule ($S_i$) are presumed to be a suitable indicator of the expected time required to reduce $S_i$ (e.g., the greater the number of gates the longer the expected processing time). Therefore, given a machine with N cores and n submodules to reduce, submodules $S_i$ are sorted by their $g_i$ value ($1 \leq i \leq n$) and then assigned to list $\{list_j\}$ of core j with lowest aggregate $G_j(t')$ metric at a given time t':

$$G_j(t') = \sum_{t=0}^{t'} g_i(t) \forall i \text{ s.t. } S_i \in \{list_j\}$$

Alternatively, submodules $S_i$ may be assigned to the processing cores in a round-robin fashion without considering the $g_i$ values. For example, $S_i$ may be assigned to core j when i(modulo N)=j.

Figure 8:
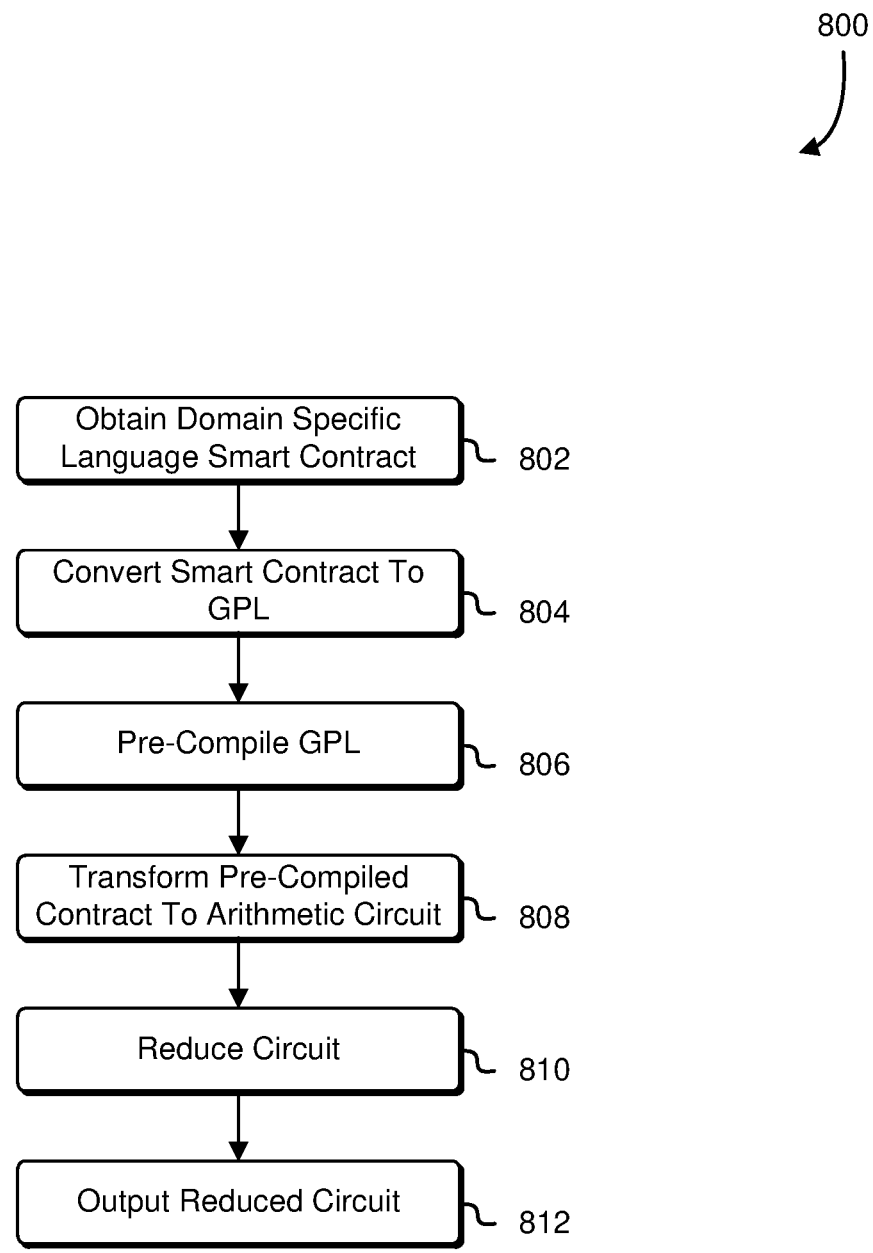
FIG. 8 is a flowchart that illustrates an example of transforming a domain-specific language contract to a reduced arithmetic circuit in accordance with an embodiment.

FIG. 8 is a flowchart illustrating an example of a process 800 for transforming a DSL contract to a reduced arithmetic circuit in accordance with various embodiments. Some or all of the process 800 (or any other processes described, or variations and/or combinations of those processes) can be performed under the control of one or more computer systems configured with executable instructions and/or other data, and may be implemented as executable instructions executing collectively on one or more processors. The executable instructions and/or other data can be stored on a non-transitory computer-readable storage medium (e.g., a computer program persistently stored on magnetic, optical, or flash media).

For example, some or all of process 800 can be performed by one or more computing devices (e.g., by a server in a data centre, by a client computing device, by multiple computing devices in a distributed system of a computing resource service provider, or by any suitable electronic client device such as the computing device 1000 of FIG. 10). The process 800 includes a series of operations wherein a smart contract written in a DSL is converted to a GPL, precompiled, and transformed into an arithmetic circuit. The arithmetic circuit is reduced in accordance with techniques described in the present disclosure and output.

In 802, the system performing the process 800 obtains a smart contract written in a DSL. As noted above, a DSL may be a computer programming language designed for use in a particular field. In embodiments, a DSL devised for composing financial instruments such as smart contract may be used. Such DSLs may make smart contracts easier for an average user to write and read and may allow non-specialist programmers to write smart contracts without having to implement any cryptography.

In 804, the system performing the process 800 converts the smart contract to a GPL. In this manner, the DSL smart contract is converted to a general form that can be compiled/interpreted into a cryptographic protocol for use in a blockchain. In embodiments, the GPL is C++ source code but it is contemplated that other GPL languages may be used.

In 806, the GPL source code is precompiled, which may include bringing library files and/or other dependencies into the precompiled source code. The process of pre-compiling may also obfuscate variable names, which may have the benefit of disguising the nature of the smart contract from the public after it is committed to the blockchain.

In 808, the system performing the process 800 transforms the precompiled source code into an arithmetic circuit, for example by converting various commands, conditional statements, variables, arithmetic operations into an arithmetic algorithm. This arithmetic algorithm may be expressed as a directed cyclical graph similar to the one shown in FIG. 5.

In 810, the system performing the process 800 performs a reduction process on the arithmetic algorithm produced in 808. The reduction process may be similar to the process 900 of FIG. 9. This reduction process may result in a smaller, simplified arithmetic algorithm that can be processed more efficiently by a blockchain node, such as the nodes 102 of FIG. 1.

In 812, the system performing the process 800 outputs the reduced arithmetic circuit. In some embodiments, the system provides the reduced circuit to another process that transforms the reduced circuit into QAP polynomials, such as the QAP polynomials 418 of FIG. 4. In other embodiments, the system provides the reduced circuit to a data store or other storage resource for future use. In still other embodiments, the system provides, such as through a display of a user interface, the reduced circuit to one or more entities (e.g., entities that created or are affected by) the original DSL contract through the user interface. Note that one or more of the operations performed in 802-12 may be performed in various orders and combinations, including in parallel.

Figure 9:
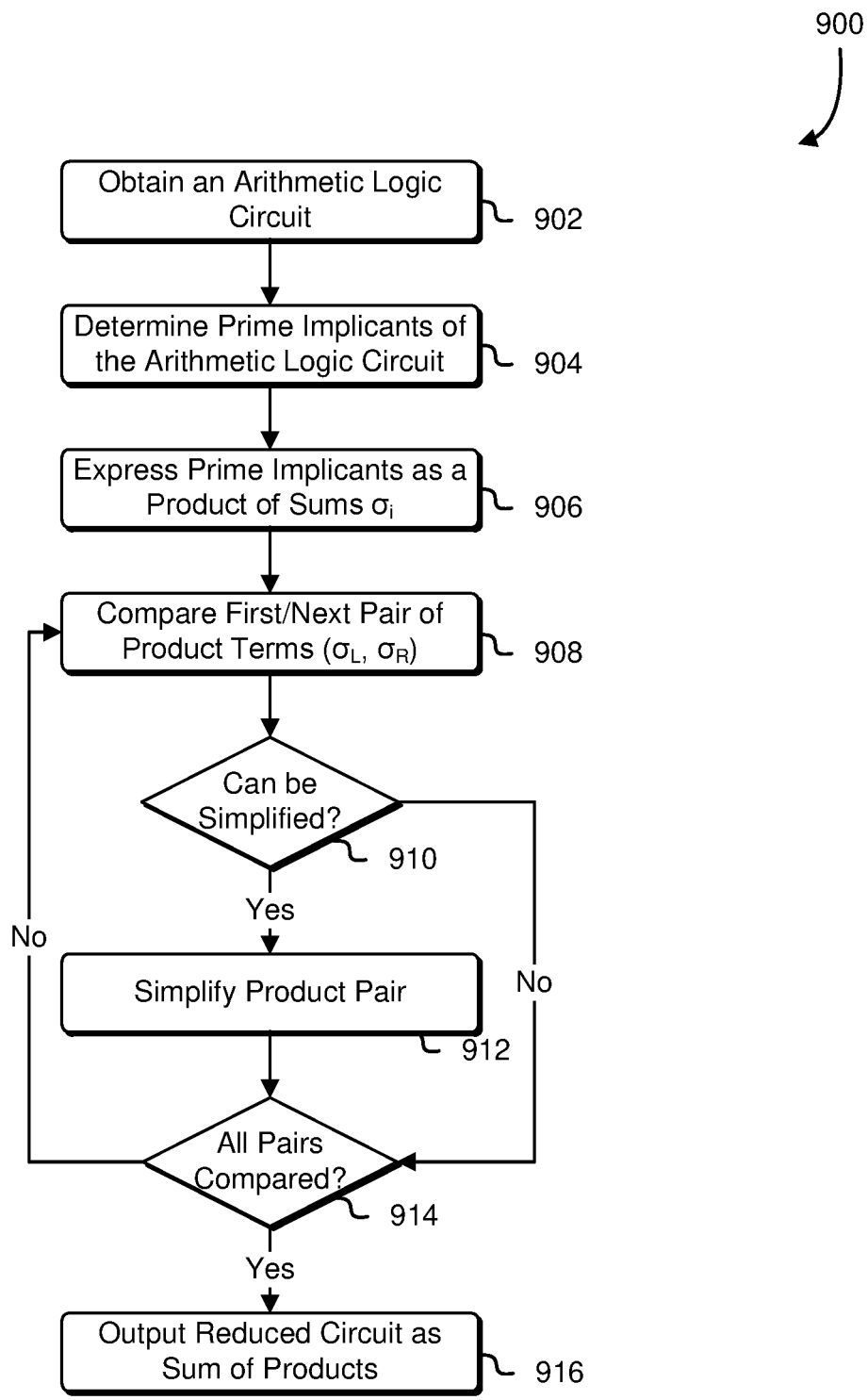
FIG. 9 is a flowchart that illustrates an example of arithmetic circuit reduction in accordance with an embodiment.

FIG. 9 is a flowchart illustrating an example of a process 900 for arithmetic circuit reduction of a pre-compiled GPL smart contract in accordance with various embodiments. Some or all of the process 900 (or any other processes described, or variations and/or combinations of those processes) can be performed under the control of one or more computer systems configured with executable instructions and/or other data, and may be implemented as executable instructions executing collectively on one or more processors. The executable instructions and/or other data can be stored on a non-transitory computer-readable storage medium (e.g., a computer program persistently stored on magnetic, optical, or flash media).

For example, some or all of process 900 can be performed by one or more computing devices (e.g., by a server in a data centre, by a client computing device, by multiple computing devices in a distributed system of a computing resource service provider, or by any suitable electronic client device such as the computing device 1000 of FIG. 10). For example, the process 900 may be performed as a result of executing the arithmetic circuit reducing module 220 of FIG. 2. The process 900 includes a series of operations wherein prime implications of an arithmetic logic circuit are determined and expressed as a product of sums, each pair of product terms are compared against logic rules to determine whether the product terms can be simplified, and after all pairs are simplified, the arithmetic circuit is output in reduced form. The operations of the process 900 expand upon the operations in 810 of FIG. 8.

In 902, the system performing the process 900, obtains the arithmetic circuit. The arithmetic circuit may be comprised of a set of minterms. In embodiments, the obtained arithmetic circuit may be transformed from precompiled GPL source code, such as from the GPL pre-processed contract 412 of FIG. 4. In embodiments, the obtained arithmetic circuit represents a smart contract. In some embodiments, the smart contract was previously written in a DSL format and converted into a GPL format.

In 904, the system performing the process isolates the prime implicants of the arithmetic logic circuit, such as in the manner described above in relation to FIG. 4. That is, the system may determine a set of implicants from the set of minterms of the arithmetic circuit. The system may determine which members of the set of implicants comprise the set of prime implicants (i.e., the product terms that result in a non-implicant if any literals are removed) of the arithmetic circuit.

In 906, the set of prime implicants may be treated as a product of the sums $\sigma_i$ of the prime implicants, such as in the manner described above in relation to FIG. 5. In 908, the system performing the process 900 compares first pair of product terms $\sigma_L$ and $\sigma_R$ to determine in 910 whether the pair can be simplified according to Boolean logic rules, such as in the manner described in relation to FIG. 7. If not, the system proceeds to 914. Otherwise, if so, the system combines and simplifies the pair in 912, whereupon the system then proceeds to 914.

In 914, the system performing the process 900 determines whether all pairs of product terms have been compared and found to be irreducible. If not, then the system returns to 908 to compare the next pair of product terms. Otherwise, in 916, the system outputs the reduced product terms as a sum of products that is the reduced arithmetic circuit. As noted above in relation to 812 of FIG. 8, the system may output the reduced arithmetic circuit to another process for further processing, to a data store, to data file, or to a user interface. Note that one or more of the operations performed in 902-16 may be performed in various orders and combinations, including in parallel.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

FIG. 10 is an illustrative, simplified block diagram of a computing device 1000 that can be used to practice at least one embodiment of the present disclosure. In various embodiments, the computing device 1000 can be used to implement any of the systems illustrated and described above. For example, the computing device 1000 can be configured for use as a data server, a web server, a portable computing device, a personal computer, or any electronic computing device. As shown in FIG. 10, the computing device 1000 could include one or more processors 1002 that, in embodiments, communicate with and are operatively coupled to a number of peripheral subsystems via a bus subsystem 1004. In some embodiments, these peripheral subsystems include a storage subsystem 1006 comprising a memory subsystem 1008 and a file/disk storage subsystem 1010, one or more user interface input devices 1012, one or more user interface output devices 1014, and a network interface subsystem 1016. Such storage subsystem 1006 could be used for temporary or long-term storage of information.

In some embodiments, the bus subsystem 1004 provides a mechanism for enabling the various components and subsystems of computing device 1000 to communicate with each other as intended. Although the bus subsystem 1004 is shown schematically as a single bus, alternative embodiments of the bus subsystem utilise multiple busses. In some embodiments, the network interface subsystem 1016 provides an interface to other computing devices and networks. The network interface subsystem 1016, in some embodiments, serves as an interface for receiving data from and transmitting data to other systems from the computing device 1000. In some embodiments, the bus subsystem 1004 is utilised for communicating data such as details, search terms, and so on.

In some embodiments, the user interface input devices 1012 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 1000. In some embodiments, the one or more user interface output devices 1014 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 1000. The one or more user interface output devices 1014 can be used, for example, to present user interfaces to facilitate user interaction with applications performing processes described and variations therein, when such interaction may be appropriate.

In some embodiments, the storage subsystem 1006 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 1006. These application modules or instructions can be executed by the one or more processors 1002. In various embodiments, the storage subsystem 1006 additionally provides a repository for storing data used in accordance with the present disclosure. In some embodiments, the storage subsystem 1006 comprises a memory subsystem 1008 and a file/disk storage subsystem 1010.

In embodiments, the memory subsystem 1008 includes a number of memories, such as a main random access memory (RAM) 1018 for storage of instructions and data during program execution and/or a read only memory (ROM) 1020, in which fixed instructions can be stored. In some embodiments, the file/disk storage subsystem 1010 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 1000 includes at least one local clock 1024. The at least one local clock 1024, in some embodiments, is a counter that represents the number of ticks that have transpired from a particular starting date and, in some embodiments, is located integrally within the computing device 1000. In various embodiments, the at least one local clock 1024 is used to synchronise data transfers in the processors for the computing device 1000 and the subsystems included therein at specific clock pulses and can be used to coordinate synchronous operations between the computing device 1000 and other systems in a data centre. In another embodiment, the local clock is a programmable interval timer.

The computing device 1000 could be of any of a variety of types, including a portable computer device, tablet computer, a workstation, or any other device described below. Additionally, the computing device 1000 can include another device that, in some embodiments, can be connected to the computing device 1000 through one or more ports (e.g., USB, a headphone jack, Lightning connector, etc.). In embodiments, such a device includes a port that accepts a fibre-optic connector. Accordingly, in some embodiments, this device is that converts optical signals to electrical signals that are transmitted through the port connecting the device to the computing device 1000 for processing. Due to the ever-changing nature of computers and networks, the description of the computing device 1000 depicted in FIG. 10 is intended only as a specific example for purposes of illustrating the preferred embodiment of the device. Many other configurations having more or fewer components than the system depicted in FIG. 10 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising", "having", "including", and "containing" are to be construed as open-ended terms (i.e., meaning "including, but not limited to") unless otherwise noted. The term "connected", when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset", unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C", or "at least one of A, B, and C", unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like do not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention can be implemented by means of hardware comprising several distinct elements, and by means of a suitably programmed computer. In a device claim enumerating several means, several of these means can be embodied by one and the same item of hardware.

The mere fact that certain measures are recited in mutually different dependent claims does not indicate that a combination of these measures cannot be used to advantage.

SUMMARY

The novel technique described and suggested in the present disclosure extend the functionality of the blockchain without disrupting the properties of the blockchain that ensure the integrity of the data stored within the blockchain data structure. For example, the techniques may improve the field of computing, specifically in the field of digital record validation where conditions for validation are defined within blockchain transactions embedded in the records. The techniques described and suggested in the present disclosure may further improve the field of computing in the field of smart contract generation and execution by enabling blockchain nodes to optimise processing resource usage by simplifying the smart contracts being validated on the blockchain. Additionally, techniques described and suggested in the present disclosure may improve the efficiency of blockchain nodes by transforming a smart contract into a reduced arithmetic circuit from which a quadratic arithmetic program can be derived, thereby enabling a blockchain node to execute the smart contract more efficiently.

Moreover, techniques described and suggested in the present disclosure may be necessarily rooted in computer technology in order to overcome problems specifically arising with smart contract details being publicly viewable once a smart contract is committed to the blockchain by converting the smart contract from a DSL to a GPL and then to a reduced arithmetic, the result causing some of the details of the smart contract to be obfuscated.

The invention claimed is:

1. A computer-implemented method comprising:
obtaining a set of conditions encoded in a first programming language, wherein the set of conditions represents a smart contract;
converting the set of conditions into a programmatic set of conditions encoded in a second programming language;
precompiling the programmatic set of conditions into precompiled program code;
transforming the precompiled program code into an arithmetic circuit which represents the smart contract, wherein the arithmetic circuit comprises inputs associated with input values to the smart contract represented by the first set of conditions;
reducing the arithmetic circuit to form a reduced arithmetic circuit; and
storing the reduced arithmetic circuit.

2. The computer-implemented method according to claim 1, wherein reducing the arithmetic circuit involves minimising the arithmetic circuit to produce the reduced arithmetic circuit.

3. The computer-implemented method according to claim 1, wherein the arithmetic circuit is a directed acyclical graph comprising:
a set of nodes representing logic gates and inputs; and
a set of edges connecting nodes in the set of nodes, individual edges in the set representing respective wires between the logic gates and the inputs.

4. The computer-implemented method according to claim 3, wherein:
the arithmetic circuit includes a logic submodule that includes a proper subset of the set of nodes; and
reducing the arithmetic circuit includes reducing the logic submodule separately from the rest of the arithmetic circuit.

5. The computer-implemented method according to claim 4, wherein the wires between logic gates in the logic submodule are 1-bit in width.

6. The computer-implemented method according to claim 4, wherein:
the arithmetic circuit further includes another logic submodule that includes another subset of the set of nodes, the proper subset of nodes and the other subset of nodes being nonintersecting; and
reducing the arithmetic circuit further includes reducing the logic submodule using a first processor core in parallel with reducing the other logic submodule using a second processor core.

7. The computer-implemented method according to claim 6, further comprising allocating the logic submodule to the first processor core and allocating the other logic submodule to the second processor core in accordance with a heuristic for optimising computational resource usage.

8. The computer-implemented method according to claim 7, wherein the heuristic is a longest processing time greedy algorithm.

9. The computer-implemented method according to claim 1, wherein reducing the arithmetic circuit includes:
determining a set of prime implicants of the arithmetic circuit;
expressing the set of prime implicants as a product of sums that includes a first product term and a second product term; and
simplifying the first product term and the second product term.

10. The computer-implemented method according to claim 9, wherein simplifying the first product term and the second product term is performed by applying a Boolean minimisation rule to the first product term and the second product term.

11. The computer-implemented method according to claim 1, wherein the second programming language is C++.

12. The computer-implemented method according to claim 1, wherein the first programming language is a computer programming language devised for composing machine-readable financial contracts.

13. The computer-implemented method according to claim 1, further comprising:
generating a quadratic program that includes a set of polynomials that describes the reduced arithmetic circuit; and
generating a set of parameters to be used by a node in a blockchain network in performance of the quadratic program.

14. A system, comprising:
a processor; and
memory including executable instructions that, as a result of being executed by the processor, causes the system to:
obtain a set of conditions encoded in a first programming language, wherein the set of conditions represents a smart contract;
convert the set of conditions into a programmatic set of conditions encoded in a second programming language;
precompile the programmatic set of conditions into precompiled program code;
transform the precompiled program code into an arithmetic circuit which represents the smart contract, wherein the arithmetic circuit comprises inputs associated with input values to the smart contract represented by the first set of conditions;
reduce the arithmetic circuit to form a reduced arithmetic circuit; and
store the reduced arithmetic circuit.

15. A non-transitory computer-readable storage medium having stored thereon executable instructions that, as a result of being executed by a processor of a computer system, cause the computer system to at least:
obtain a set of conditions encoded in a first programming language, wherein the set of conditions represents a smart contract;
convert the set of conditions into a programmatic set of conditions encoded in a second programming language;
precompile the programmatic set of conditions into precompiled program code;
transform the precompiled program code into an arithmetic circuit which represents the smart contract, wherein the arithmetic circuit comprises inputs associated with input values to the smart contract represented by the first set of conditions;
reduce the arithmetic circuit to form a reduced arithmetic circuit; and
store the reduced arithmetic circuit.

16. A system, comprising:
a processor; and
memory including executable instructions that, as a result of being executed by the processor, causes the system to:
- obtain a set of conditions encoded in a first programming language, wherein the set of conditions represents a smart contract;
- convert the set of conditions into a programmatic set of conditions encoded in a second programming language;
- precompile the programmatic set of conditions into precompiled program code;
- transform the precompiled program code into an arithmetic circuit which represents the smart contract, wherein the arithmetic circuit comprises inputs associated with input values to the smart contract represented by the first set of conditions;
- reduce the arithmetic circuit to form a reduced arithmetic circuit; and
- store the reduced arithmetic circuit, wherein reducing the arithmetic circuit involves minimising the arithmetic circuit to produce the reduced arithmetic circuit.

17. A system, comprising:
a processor; and
memory including executable instructions that, as a result of being executed by the processor, causes the system to:
- obtain a set of conditions encoded in a first programming language, wherein the set of conditions represents a smart contract;
- convert the set of conditions into a programmatic set of conditions encoded in a second programming language;
- precompile the programmatic set of conditions into precompiled program code;
- transform the precompiled program code into an arithmetic circuit which represents the smart contract, wherein the arithmetic circuit comprises inputs associated with input values to the smart contract represented by the first set of conditions;
- reduce the arithmetic circuit to form a reduced arithmetic circuit; and
- store the reduced arithmetic circuit, wherein the arithmetic circuit is a directed acyclical graph comprising:
  - a set of nodes representing logic gates and inputs; and
  - a set of edges connecting nodes in the set of nodes, individual edges in the set representing respective wires between the logic gates and the inputs.

18. A system, comprising:
a processor; and
memory including executable instructions that, as a result of being executed by the processor, causes the system to:
- obtain a set of conditions encoded in a first programming language, wherein the set of conditions represents a smart contract;
- convert the set of conditions into a programmatic set of conditions encoded in a second programming language;
- precompile the programmatic set of conditions into precompiled program code;
- transform the precompiled program code into an arithmetic circuit which represents the smart contract, wherein the arithmetic circuit comprises inputs associated with input values to the smart contract represented by the first set of conditions, wherein the arithmetic circuit is a directed acyclical graph comprising:
  - a set of nodes representing logic gates and inputs; and
  - a set of edges connecting nodes in the set of nodes, individual edges in the set representing respective wires between the logic gates and the inputs
- reduce the arithmetic circuit to form a reduced arithmetic circuit;
- store the reduced arithmetic circuit, the arithmetic circuit includes a logic submodule that includes a proper subset of the set of nodes; and
- reduce the arithmetic circuit includes reducing the logic submodule separately from the rest of the arithmetic circuit.

19. A non-transitory computer-readable storage medium having stored thereon executable instructions that, as a result of being executed by a processor of a computer system, cause the computer system to:
- obtain a set of conditions encoded in a first programming language, wherein the set of conditions represents a smart contract;
- convert the set of conditions into a programmatic set of conditions encoded in a second programming language;
- precompile the programmatic set of conditions into precompiled program code;
- transform the precompiled program code into an arithmetic circuit which represents the smart contract, wherein the arithmetic circuit comprises inputs associated with input values to the smart contract represented by the first set of conditions;
- reduce the arithmetic circuit to form a reduced arithmetic circuit; and
- store the reduced arithmetic circuit, wherein reducing the arithmetic circuit involves minimising the arithmetic circuit to produce the reduced arithmetic circuit.

20. A non-transitory computer-readable storage medium having stored thereon executable instructions that, as a result of being executed by a processor of a computer system, cause the computer system to:
- obtain a set of conditions encoded in a first programming language, wherein the set of conditions represents a smart contract;
- convert the set of conditions into a programmatic set of conditions encoded in a second programming language;
- precompile the programmatic set of conditions into precompiled program code;
- transform the precompiled program code into an arithmetic circuit which represents the smart contract, wherein the arithmetic circuit comprises inputs associated with input values to the smart contract represented by the first set of conditions;
- reduce the arithmetic circuit to form a reduced arithmetic circuit; and
- store the reduced arithmetic circuit, wherein the arithmetic circuit is a directed acyclical graph comprising:
  - a set of nodes representing logic gates and inputs; and
  - a set of edges connecting nodes in the set of nodes, individual edges in the set representing respective wires between the logic gates and the inputs.

* * * * *